US012289551B2

(12) United States Patent
Lim

(10) Patent No.: US 12,289,551 B2
(45) Date of Patent: Apr. 29, 2025

(54) UNIT PIXEL AND IMAGE SENSOR INCLUDING THE SAME

(71) Applicant: SAMSUNG ELECTRONICS CO., LTD., Suwon-si (KR)

(72) Inventor: Jung Wook Lim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/068,781

(22) Filed: Dec. 20, 2022

(65) Prior Publication Data

US 2023/0224608 A1   Jul. 13, 2023

(30) Foreign Application Priority Data

Jan. 10, 2022 (KR) .................. 10-2022-0003115

(51) Int. Cl.
*H04N 25/77* (2023.01)
*H04N 25/47* (2023.01)
*H04N 25/709* (2023.01)

(52) U.S. Cl.
CPC ............. *H04N 25/77* (2023.01); *H04N 25/47* (2023.01); *H04N 25/709* (2023.01)

(58) Field of Classification Search
CPC ...... H04N 25/77; H04N 25/47; H04N 25/709; H04N 25/585; H04N 25/621; H04N 25/79; H04N 25/778; H04N 25/76; H04N 25/46; H04N 25/75; H04N 25/00; H04N 25/59; H04N 25/60; H04N 25/70; H04N 25/702; H04N 25/771
See application file for complete search history.

(56) References Cited

U.S. PATENT DOCUMENTS

| | | | | |
|---|---|---|---|---|
| 6,253,161 B1 * | 6/2001 | Arias-Estrada | ........ | H04N 25/47 348/E3.018 |
| 7,202,463 B1 * | 4/2007 | Cox | .......................... | G01J 1/46 250/214 R |
| 9,973,717 B1 * | 5/2018 | Dharia | .................... | H04N 25/75 |
| 10,136,084 B1 | 11/2018 | Solheim et al. | | |
| 10,714,517 B2 * | 7/2020 | Lee | .................... | H01L 27/14634 |
| 2003/0015647 A1 | 1/2003 | Guo et al. | | |

(Continued)

FOREIGN PATENT DOCUMENTS

KR   1020100039120   4/2010

*Primary Examiner* — Albert H Cutler
(74) *Attorney, Agent, or Firm* — F. CHAU & ASSOCIATES, LLC

(57) ABSTRACT

A unit pixel includes a first photoelectric conversion unit configured to generate first charges in response to a first incident light, a first transfer transistor connected between the first photoelectric conversion unit and a first node, a connecting transistor connected between a second node and the first node, a second photoelectric conversion unit configured to generate second charges in response to a second incident light, a second transfer transistor connected between a second photoelectric conversion unit and a third node, a switch transistor connected between the third node and the second node, a source follower connected to the first node, a selection transistor connected to the source follower, an overflow transistor connecting the first photoelectric conversion unit and a power supply voltage, and a comparator configured to turn on the overflow transistor.

7 Claims, 24 Drawing Sheets

(56) References Cited

U.S. PATENT DOCUMENTS

| | | | |
|---|---|---|---|
| 2005/0057675 A1* | 3/2005 | Lee | H04N 25/626 |
| | | | 348/308 |
| 2007/0158533 A1* | 7/2007 | Bamji | H04N 25/00 |
| | | | 250/208.1 |
| 2010/0259570 A1* | 10/2010 | Omi | H01L 27/14645 |
| | | | 356/222 |
| 2019/0215471 A1 | 7/2019 | Oh | |
| 2019/0306442 A1* | 10/2019 | Murakami | H04N 25/59 |
| 2020/0092459 A1 | 3/2020 | Bitan et al. | |
| 2024/0171836 A1* | 5/2024 | Lee | H04N 23/54 |

* cited by examiner

|  | G1 | R1 | G3 | R2 |
|---|---|---|---|---|
| COL1' | B1 | G2 | B2 | G4 |
|  | G5 | R3 | G7 | R4 |
|  | B3 | G6 | B4 | G8 |

UNIT PIXEL AND IMAGE SENSOR INCLUDING THE SAME

CROSS-REFERENCE TO RELATED APPLICATIONS

This application claims priority under 35 U.S.C. § 119 to Korean Patent Application No. 10-2022-0003115, filed on Jan. 10, 2022 in the Korean Intellectual Property Office, the disclosure of which is incorporated by reference herein in its entirety.

TECHNICAL FIELD

Embodiments of the present invention relate to a unit pixel and an image sensor including the unit pixel.

DISCUSSION OF RELATED ART

An image sensing device may convert optical information into an electric signal. Such an image sensing device includes, for example, a charged coupled device (CCD) image sensing device and a complementary metal-oxide semiconductor (CMOS) image sensing device.

The CMOS image sensor may be abbreviated as a CIS (CMOS image sensor). The CIS may include a plurality of pixels placed two-dimensionally. Each of the pixels may include, for example, a photodiode (PD), which may serve to convert incident light into electrical signals.

SUMMARY

Aspects of the present invention provide a unit pixel having increased image quality.

Aspects of the present invention also provide an image sensor having increased image quality.

According to an embodiment of the present invention, there is provided a unit pixel including a first photoelectric conversion unit configured to generate first charges in response to a first incident light, a first transfer transistor connected between the first photoelectric conversion unit and a first node and configured to transfer the first charges to the first node, a connecting transistor connected between a second node and the first node, a second photoelectric conversion unit configured to generate second charges in response to a second incident light, a second transfer transistor connected between a second photoelectric conversion unit and a third node, a switch transistor connected between the third node and the second node, a source follower connected to the first node, a selection transistor connected to the source follower, and configured to operate based on a selection signal and to output a pixel voltage generated based on the first charges or the second charges, an overflow transistor connecting the first photoelectric conversion unit and a power supply voltage, and a comparator configured to turn on the overflow transistor when a level of the pixel voltage is smaller than a level of a threshold voltage.

According to an embodiment of the present invention, there is provided an image sensor including a first pixel which includes a first photoelectric conversion unit and a first overflow transistor connected to the first photoelectric conversion unit, a second pixel which includes a second photoelectric conversion unit and a second overflow transistor connected to the second photoelectric conversion unit, a column line configured to receive a first pixel voltage obtained by converting charges generated from the first photoelectric conversion unit and to receive a second pixel voltage obtained by converting charges generated from the second photoelectric conversion unit, and a first comparator configured to turn on the first overflow transistor when a level of the first pixel voltage is smaller than a level of a threshold voltage, and to turn on the second overflow transistor when the level of the second pixel voltage is smaller than the level of the threshold voltage.

According to an embodiment of the present disclosure, there is provided a unit pixel including a first photoelectric conversion unit configured to convert received light into charges, a first transfer transistor connected between the first photoelectric conversion unit and a first node, a connecting transistor connected between a second node and the first node, a second transfer transistor connected between a third node and the second node, a second photoelectric conversion unit connected to the third node and configured to convert the received light into the charges, a source follower connected to the first node, a selection transistor connected to the source follower, and configured to operate on the basis of a selection signal and to output a pixel voltage, and a p-type metal-oxide semiconductor (PMOS) transistor connected to the first photoelectric conversion unit and configured to operate on the basis of the pixel voltage.

BRIEF DESCRIPTION OF THE DRAWINGS

The above and other aspects and features of the present invention will become more apparent by describing in detail embodiments thereof with reference to the accompanying drawings, in which:

FIG. 20 is a diagram for explaining the pixel array of FIG. 19 according to some embodiments;

DETAILED DESCRIPTION OF THE EMBODIMENTS

Figure 1:
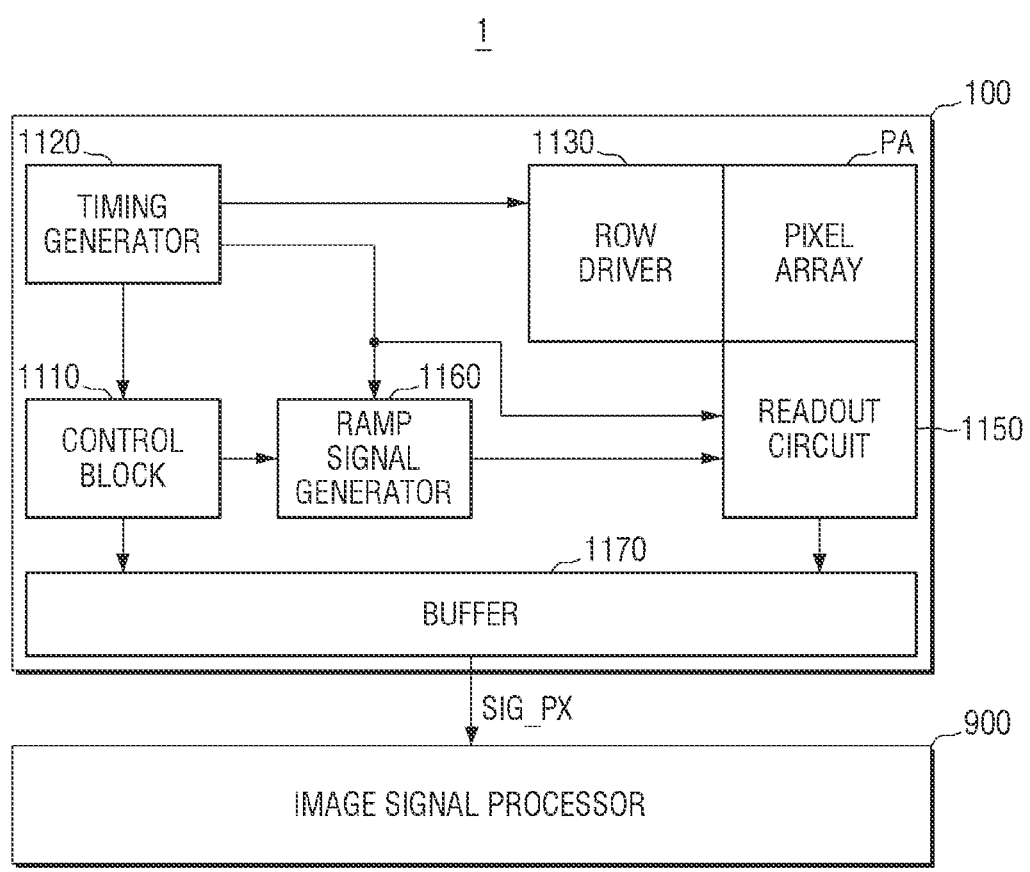
FIG. 1 is a block diagram of the image sensing device according to some embodiments.

Embodiments of the present invention will be described more fully hereinafter elements throughout the accompanying with reference to the accompanying drawings. Like reference numerals may refer to like drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

FIG. 1 is a block diagram of an image sensing device according to some embodiments.

Referring to FIG. 1, an image sensing device 1 may include an image sensor 100 and an image signal processor 900.

The image sensor 100 may generate a pixel signal SIG_PX, by sensing an image to be sensed using light. In some embodiments, although the generated pixel signal SIG_PX may be, for example, a digital signal, the generated pixel signal SIG_PX is not limited thereto. Further, the pixel signal SIG_PX may include a specific signal voltage, a reset voltage, etc.

The pixel signal SIG_PX may be provided to the image signal processor 900 and processed therein. The image signal processor 900 receives the pixel signal SIG_PX that is output from a buffer 1170 of the image sensor 100, and may process or treat the received pixel signal SIG_PX to display the pixel signal.

In some embodiments, the image signal processor 900 may perform digital binning on the pixel signal SIG_PX that is output from the image sensor 100. The pixel signal SIG_PX that is output from the image sensor 100 may be a raw image signal from the pixel array PA without analog binning, and may also be the pixel signal SIG_PX on which the analog binning has already been performed.

In some embodiments, the image sensor 100 and the image signal processor 900 may be disposed separately from each other as shown in FIG. 1. For example, the image sensor 100 may be mounted on a first chip and the image signal processor 900 may be mounted on a second chip, and the image sensor 100 and the image signal processor 900 may communicate with each other through a predetermined interface. However, embodiments of the present invention are not limited thereto. For example, in some embodiments, the image sensor 100 and the image signal processor 900 may be implemented as a single package, for example, a multi-chip package (MCP).

The image sensor 100 may include a control register block 1110, a timing generator 1120, a row driver 1130, a pixel array PA, a readout circuit 1150, a ramp signal generator 1160, and a buffer 1170.

The control register block 1110 may generally control the operation of the image sensor 100. For example, the control register block 1110 may directly transmit an operating signal to the timing generator 1120, the ramp signal generator 1160 and the buffer 1170.

The timing generator 1120 may generate a signal that serves as a reference for the operating timing of various components of the image sensor 100. An operating timing reference signal generated by the timing generator 1120 may be sent to the row driver 1130, the readout circuit 1150, and the ramp signal generator 1160, etc.

The ramp signal generator 1160 may generate and transmit the ramp signal that is used in the readout circuit 1150. For example, the readout circuit 1150 may include a correlated double sampler (CDS), a comparator, etc. The ramp signal generator 1160 may generate and transmit the ramp signal that is used in the correlated double sampler (CDS), the comparator, etc.

The buffer 1170 may include, for example, a latch. The buffer 1170 may temporarily store the pixel signal SIG_PX to be provided to outside of the image sensor 100, and may transmit the pixel signal SIG_PX to an external memory or an external device. The buffer 1170 may include a memory such as, for example, a DRAM or a SRAM.

The pixel array PA may sense external images. The pixel array PA may include a plurality of pixels (or unit pixels). The row driver 1130 may selectively activate the row of the pixel array PA.

The readout circuit 1150 may sample the pixel signal provided from the pixel array PA, compare the pixel signal to the ramp signal, and then convert an analog image signal (data) into a digital image signal (data) on the basis of the comparison results.

Figure 2:
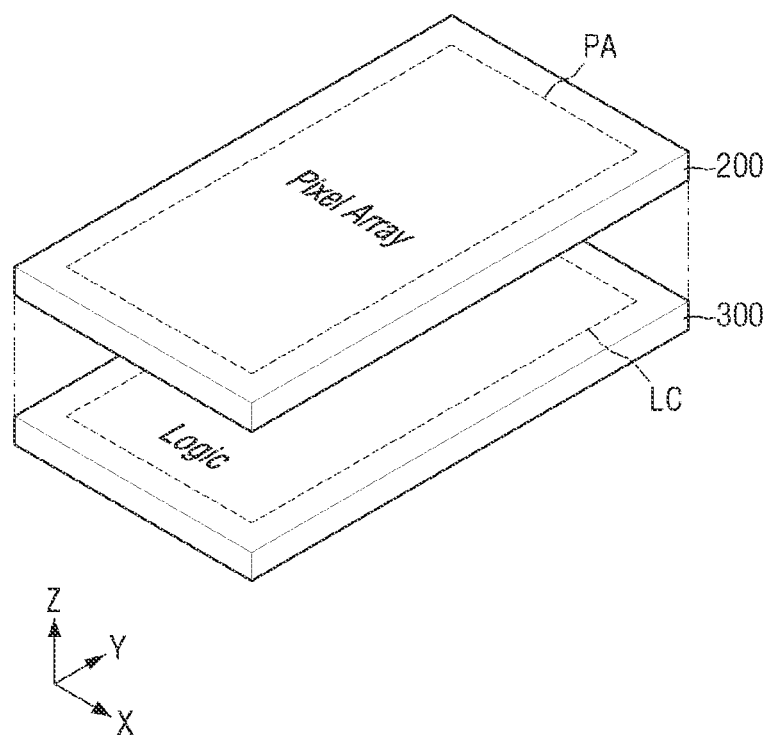
FIG. 2 is a diagram which shows a conceptual layout of the image sensor according to some embodiments.

FIG. 2 is a diagram showing a conceptual layout of the image sensor according to some embodiments.

Referring to FIG. 2, the image sensor 100 according to an embodiment may include an upper chip 200 and a lower chip 300, which are stacked on each other. A plurality of pixels may be placed on the upper chip 200 in a two-dimensional array structure. That is, the upper chip 200 may include a pixel array PA. The lower chip 300 may include an analog region including the readout circuit 1150, and a logic region LC. The lower chip 300 is placed below the upper chip 200 and may be electrically connected to the upper chip 200. The lower chip 300 may receive the pixel signal from the upper chip 200, and the logic region LC may receive the pixel signal.

Logic elements may be placed in the logic region LC of the lower chip 300. The logic elements may include circuits for processing the pixel signal from the pixels. For example, the logic elements may include the control register block 1110, the timing generator 1120, the row driver 1130, the readout circuit 1150, the ramp signal generator 1160, etc., as shown in FIG. 1.

Figure 3:
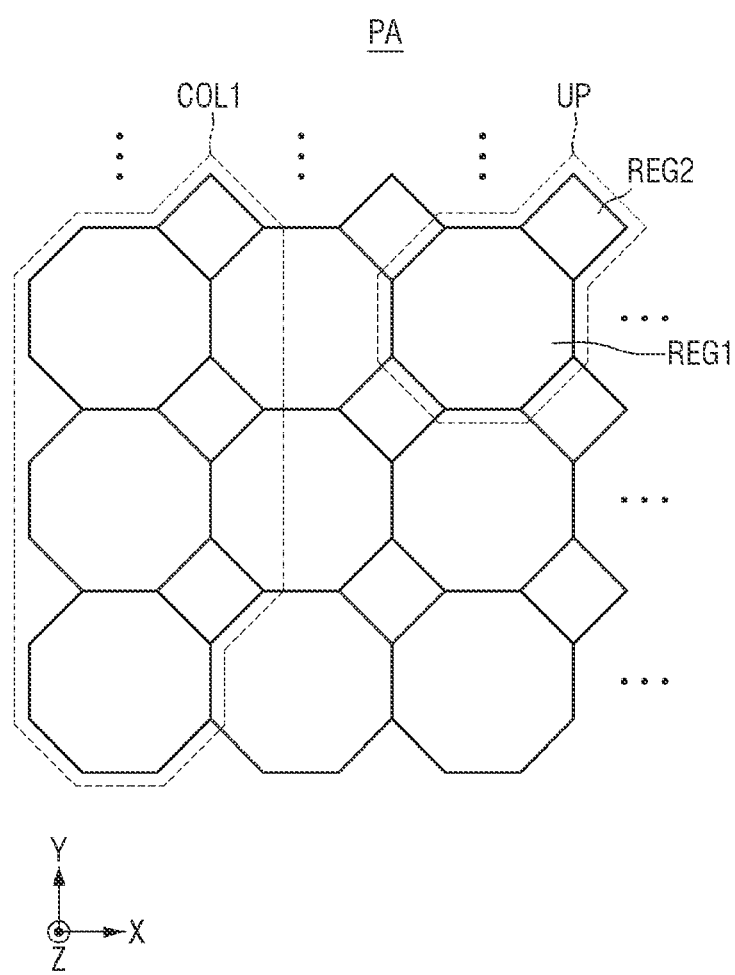
FIG. 3 is a plan view of a pixel array according to some embodiments.

FIG. 3 is a plan view of the pixel array according to some embodiments.

Referring to FIG. 3, the pixel array PA may include a plurality of first columns COL1. The first column COL1 may extend in a second direction Y, and may include a plurality of unit pixels UP. For example, the plurality of unit pixels UP may be regularly arranged in the first direction X and the second direction Y. In this disclosure, the unit pixel UP may be a pixel unit that receives light and outputs an image corresponding to one pixel.

The unit pixel UP may include a first region REG1 and a second region REG2. The first region REG1 and the second region REG2 may be distinguished from each other when viewed from an upper surface. Although the first region REG1 may have an octagonal shape as shown in FIG. 3, and the second region REG2 may have a quadrangular shape as shown in FIG. 3, embodiments of the present invention are not limited thereto. The first region REG1 and the second region REG2 may come into contact with each other. An area of the first region REG1 may be greater than an area of the second region REG2. That is, an amount of light incident on the first region REG1 may be greater than an amount of light incident on the second region REG2. The unit pixel UP corresponding to the first region REG1 and the second region REG2 may convert light to generate an electric signal.

Figure 4:
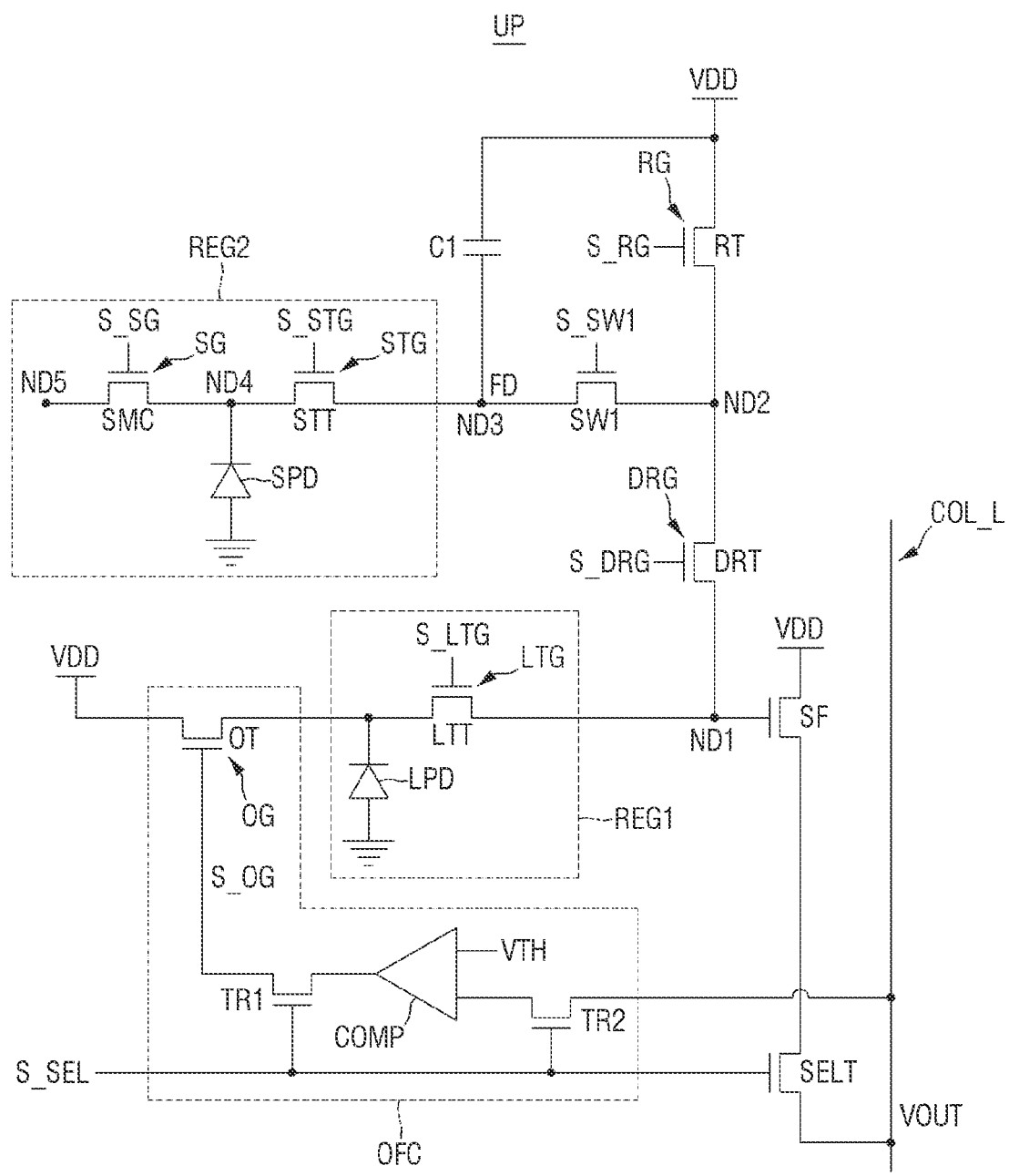
FIG. 4 is a circuit diagram of a unit pixel according to some embodiments.

FIG. 4 is a circuit diagram of the unit pixel according to some embodiments.

Referring to FIG. 4, the unit pixel UP may include a large photodiode LPD, a small photodiode SPD, a large transfer transistor LTT, a small transfer transistor STT, a source follower SF, a selection transistor SELT, a connecting transistor DRT, a reset transistor RT, a first switch SW1, a first capacitor C1, and a storage MOS capacitor SMC. Further, the unit pixel UP may include an overflow feedback circuit OFC. The overflow feedback circuit OFC may include an overflow transistor OT, a comparator COMP, a first transistor TR1, and a second transistor TR2. In FIG. 4, although the comparator COMP is shown as being included in the unit pixel UP, embodiments of the present invention are not limited thereto.

The large photodiode LPD may correspond to a photoelectric conversion unit. That is, the large photodiode LPD may convert the light incident on the first region REG1 into the charges. The large photodiode LPD may be placed in the first region REG1. Also, the large photodiode LPD may store the converted charges. One end of the large photodiode LPD may be connected to a ground voltage. The large transfer transistor LTT may be connected between the large photodiode LPD and a first node ND1. That is, both ends of the large transfer transistor LTT may be connected to one end of the large photodiode LPD and the first node ND1. The large transfer transistor LTT may include a large transfer gate LTG. A large transfer gate signal S_LTG may be applied to the large transfer gate LTG to control the large transfer transistor LTT. For example, when the large transfer gate signal S_LTG is pulled up, the large transfer transistor LTT is turned on and the charges generated from the large photodiode LPD may be sent to the first node ND1. The first node ND1 may correspond to a floating diffusion region of the unit pixel UP. The large transfer transistor LTT may also be placed in the first region REG1, but embodiments of the present invention are not limited thereto.

The overflow transistor OT may be connected to one end of the large photodiode LPD. For example, the overflow transistor OT may be placed between the large photodiode LPD and a power supply voltage VDD. Further, the overflow transistor OT may include an overflow gate OG. The overflow gate signal S_OG may be applied to the overflow gate OG, and the overflow transistor OT may operate on the basis of the overflow gate signal S_OG. The overflow transistor OT may drain the charges generated from the large photodiode LPD.

The comparator COMP, the first transistor TR1 and the second transistor TR2 may be connected between the column line COL_L, the overflow transistor OT, and the selection transistor SELT. A more detailed description thereof is provided below.

A gate of the source follower SF may be connected to the first node ND1. That is, the gate of the source follower SF is connected to the floating diffusion region and the charges may be applied thereto. The source follower SF may be connected to the power supply voltage VDD and one end of the selection transistor SELT. The source follower SF may operate based on the charges applied to the first node ND1. The selection transistor SELT may be connected to the source follower SF and the output voltage VOUT. The selection signal S_SEL may be applied to the gate of the selection transistor SELT to control the selection transistor SELT. The selection transistor SELT may operate only while the unit pixel UP is operating. The selection signal S_SEL may be sent to the first and second transistors TR1 and TR2.

The connecting transistor DRT may be located between the first node ND1 and the second node ND2. Further, the connecting transistor DRT may include a connecting gate DRG to which the connecting gate signal S_DRG is applied. The connecting transistor DRT may connect the first node ND1 and the second node ND2 when the connecting gate signal S_DRG is pulled up. The reset transistor RT may be located between the second node ND2 and the power supply voltage VDD. The reset transistor RT may include a reset gate RG to which the reset gate signal S_RG is applied. When the reset gate signal S_RG is pulled up, the reset transistor RT may connect the second node ND2 to the power supply voltage VDD to reset the unit pixel UP.

The first switch SW1 may be located between the second node ND2 and a third node ND3. The first switch signal S_SW1 may be applied to the gate of the first switch SW1 and connect the third node ND3 and the second node ND2. The first capacitor C1 may be connected between the third node ND3 and the power supply voltage VDD. That is, the first capacitor C1 may be connected to all of the first switch SW1, the reset transistor RT, and the small transfer transistor STT. The first capacitor C1 may receive the charges that overflow from the small photodiode SPD. Further, the first capacitor C1 may accumulate the charges that overflow from the small photodiode SPD. In some embodiments, the first capacitor C1 is not placed in the second region REG2. For example, the first capacitor C1 may be placed on the lower chip 300 of FIG. 2 in some embodiments.

The small photodiode SPD may correspond to a photoelectric conversion unit. That is, the small photodiode SPD may convert the light incident on the second region REG2 into the charges. The small photodiode SPD may be located in the second region REG2. In addition, the small photodiode SPD may store the converted charges. One end of the small photodiode SPD may be connected to a fourth node ND4. One end of the small photodiode SPD may be connected to the ground voltage. The small transfer transistor STT may be connected between the fourth node ND4 and the third node ND3. The small transfer transistor STT may include a small transfer gate STG. A small transfer gate signal S_STG may be applied to the small transfer gate STG to control the small transfer transistor STT. For example, when the small transfer gate signal S_STG is pulled up, the small transfer transistor STT is turned on and the charges generated from the small photodiode SPD may be transferred to the third node ND3. The third node ND3 may correspond to the floating diffusion region of the unit pixel UP. That is, the third node ND3 may correspond to a floating diffusion region different from that of the first node ND1. The small transfer transistor STT may also be placed in the second region REG2, but embodiments of the present invention are not limited thereto.

The storage MOS capacitor SMC may be connected between the fourth node ND4 and the fifth node ND5. The storage MOS capacitor SMC may include an insulating layer and a gate electrode sequentially stacked on the substrate. Since the storage MOS capacitor SMC is connected to the fourth node ND4, the storage MOS capacitor SMC may be connected to both the small photodiode SPD and the small transfer transistor STT. That is, the storage MOS capacitor SMC may be connected to both the fourth node ND4 and the fifth node ND5. The fifth node ND5 may correspond to a floating node. For example, no voltage is applied to the fifth node ND5. Therefore, no channel is formed between the fourth node ND4 and the fifth node ND5. The storage MOS capacitor SMC may include a storage gate SG to which the storage gate signal S_SG is applied. The storage gate signal S_SG may control the operation of the storage MOS capacitor SMC. The storage MOS capacitor SMC may be placed in the second region REG2, but embodiments of the present invention are not limited thereto.

The storage MOS capacitor SMC is placed adjacent to the small photodiode SPD and may receive and store the charges from the small photodiode SPD. When the charges generated from the small photodiode SPD fill the small photodiode SPD, the charges may be transferred from the small photodiode SPD to the storage MOS capacitor SMC. Subsequently, when the storage MOS capacitor SMC is filled with the charges, the charges overflowing from the storage MOS capacitor SMC and the small photodiode SPD may be transferred to the first capacitor C1. At this time, by adjusting the storage gate signal S_SG of the storage MOS capacitor SMC, the amount of charges stored in the storage MOS capacitor SMC may be determined. The second region REG2 in which the small photodiode SPD is placed in the unit pixel UP corresponds to a smaller area than the first region REG1. Therefore, the small photodiode SPD may not sufficiently store the charges converted from the received light. The storage MOS capacitor SMC may increase the full well capacity (FWL) by storing the charges from the small photodiode SPD. By storing the charges in the storage MOS capacitor SMC, the capacitance may be increased, and the full-well capacitor may also be increased accordingly. Further, the dynamic range (DR) of the signal that is output from the unit pixel UP may increase accordingly.

Although the unit pixel UP of FIG. 4 is shown to include the storage MOS capacitor SMC, embodiments of the present invention are not limited thereto. For example, in some embodiments, the unit pixel UP does not include the MOS capacitor SMC. That is, only the small photodiode SPD may be connected to the small transfer transistor STT in some embodiments.

Hereinafter, the operation of the unit pixel UP will be described with reference to FIGS. 4 to 10.

Figure 5:
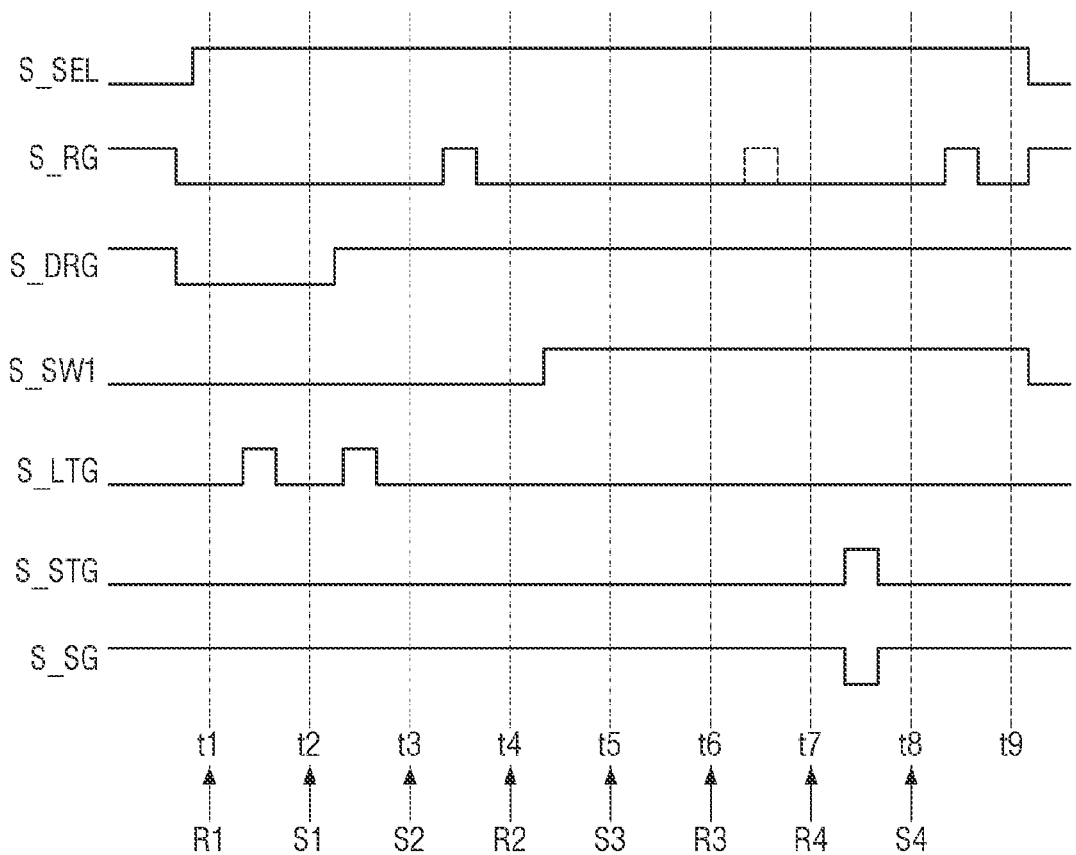
FIG. 5 is a timing diagram for explaining a method of operating the unit pixel according to some embodiments.
Figure 6:
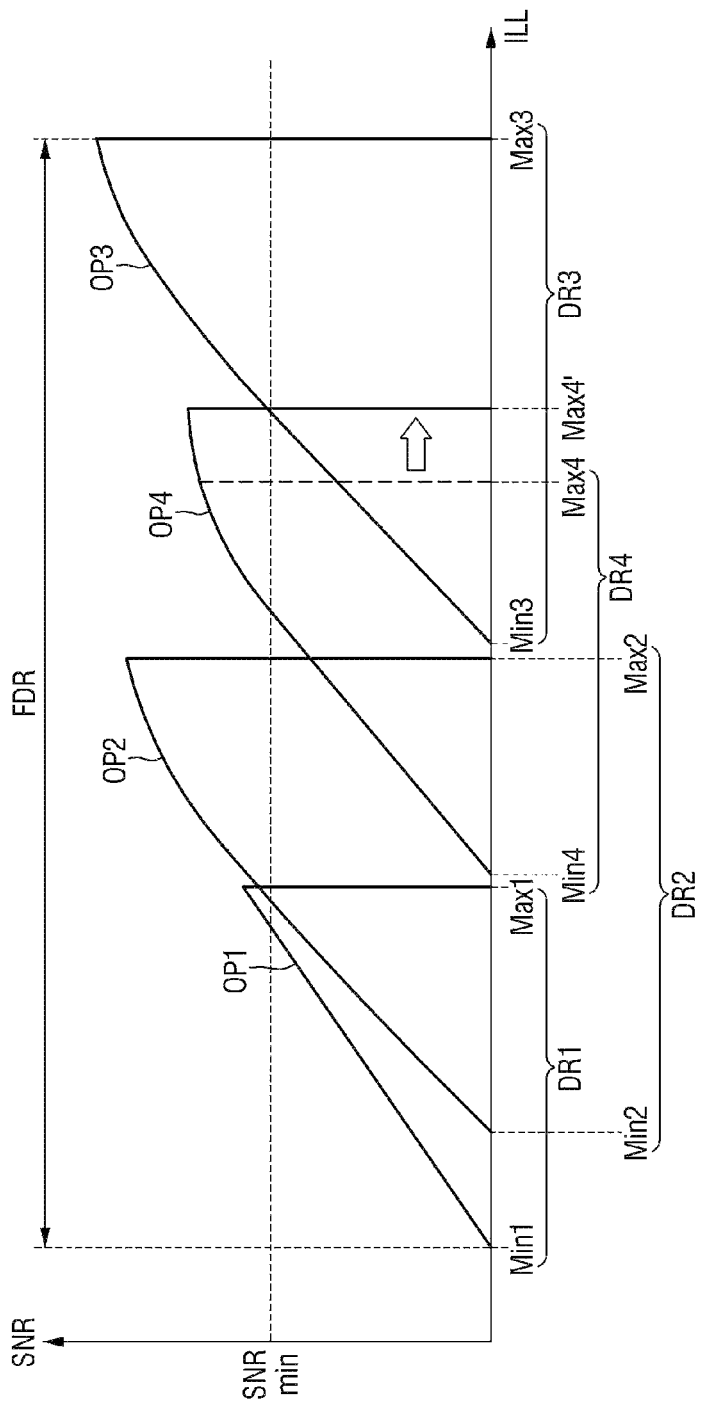
FIG. 6 is a diagram of a signal-to-noise ratio according to illuminance of a unit pixel by the operation of a unit pixel according to some embodiments.

FIG. 5 is a timing diagram for explaining the operating method of the unit pixel according to some embodiments. FIG. 6 is a diagram of the signal-to-noise ratio according to the illuminance of the unit pixel by the operation of the unit pixel according to some embodiments. FIGS. 7 to 10 are diagrams for explaining the operation of the unit pixel according to some embodiments.

Referring to FIGS. 4 to 10, the unit pixel UP may perform a first reset operation R1 at the first time t1. During the time interval before the first time t1, the selection signal S_SEL is pulled up, the reset gate signal S_RG is pulled down, and the connecting gate signal S_DRG may be pulled down. Further, the first switch signal S_SW1, the large transfer gate signal S_LTG, and the small transfer gate signal S_STG may be in a turned-off state, and the storage gate signal S_SG may be in a turned-on state. Accordingly, a first reset voltage VR1 in which the charges accumulated in the first node ND1 are converted may be output at the first time t1. At this time, the source follower SF may convert the charges accumulated in the first node ND1 into the first reset voltage VR1.

Figure 7:
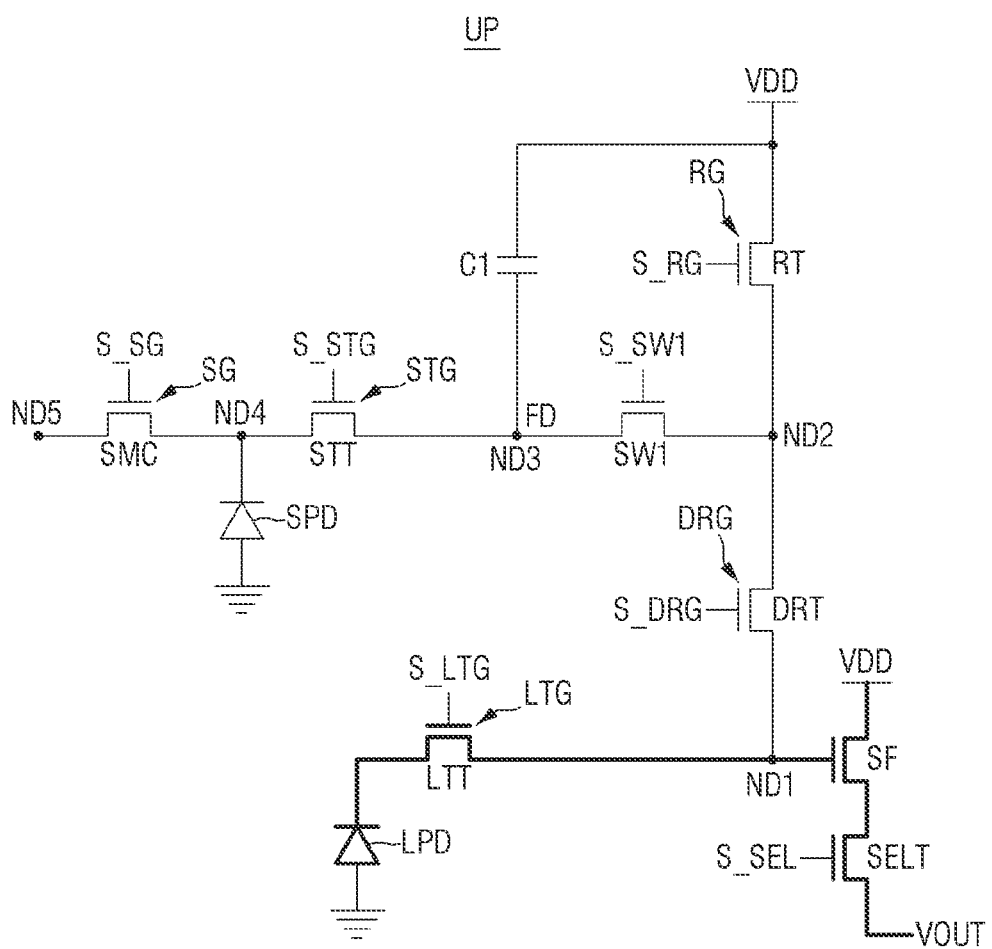
FIGS. 7 to 10 are diagrams for explaining the operation of the unit pixel according to some embodiments.

Referring to FIGS. 5 to 7, the unit pixel UP may perform the first signal operation S1 at the second time t2. During the time interval between the first time t1 and the second time t2, the large transfer gate signal S_LTG may be pulled up and then pulled down. When the large transfer gate signal S_LTG is pulled up, the large transfer transistor LTT may be turned on. That is, the large transfer transistor LTT may connect the large photodiode LPD and the first node ND1. The large photodiode LPD may store the charges before the large transfer gate signal S_LTG is pulled up. The large transfer transistor LTT may transfer the charges generated from the large photodiode LPD to the first node ND1, that is, the floating diffusion region. At this time, the charges transferred to the first node ND1 may be converted into the first signal voltage VS1 by the source follower SF. In this case, the capacitance of the floating diffusion region of the unit pixel UP may be small, and therefore, the full-well capacitor may also be small.

Referring to FIG. 6, a first operation OP1 may include a first reset operation R1 and a first signal operation S1. The first operation OP1 may have a first minimum illuminance Min1 and a first maximum illuminance Max1. That is, the first operation OP1 may correspond to a first dynamic range DR1 corresponding to the region of the first minimum illuminance Min1 to the first maximum illuminance Max1. The signal output by the first operation OP1 may have the first dynamic range DR1. The first dynamic range DR1 may be used for image sensing in a low illuminance environment.

Figure 8:
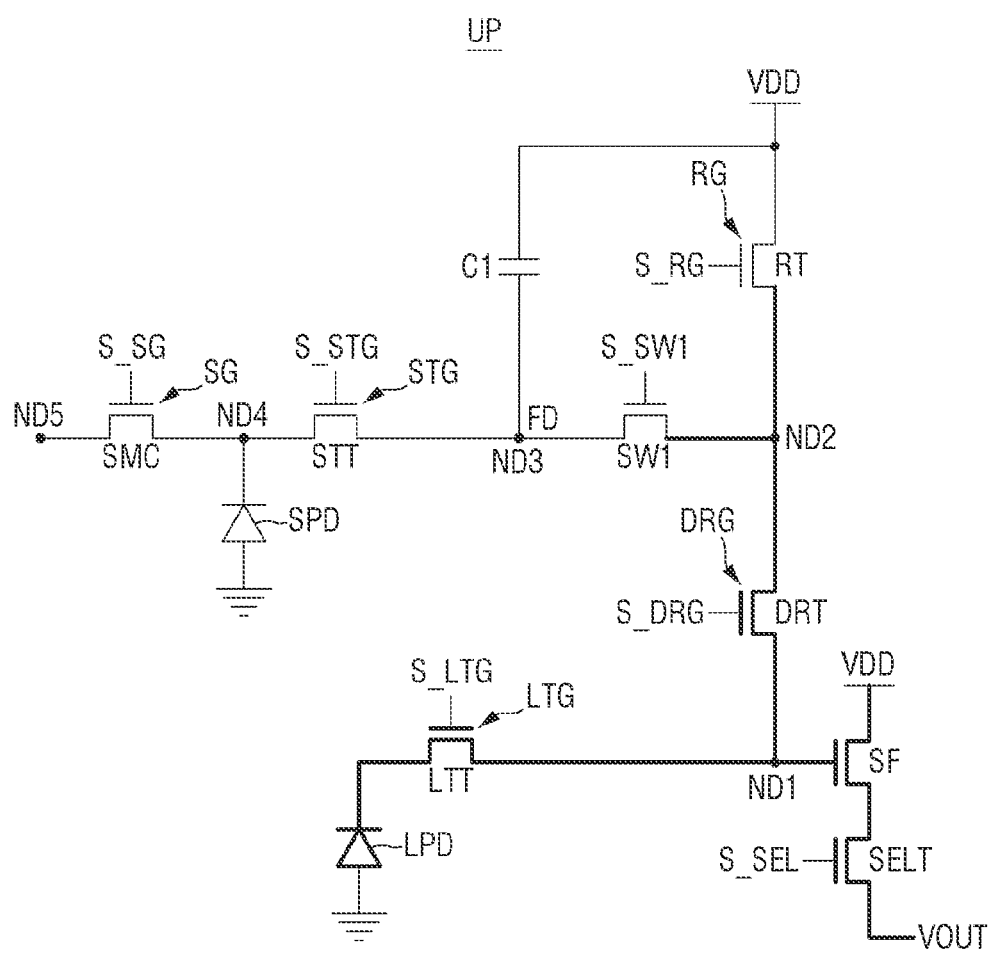

Referring to FIGS. 4, 5 and 8, the unit pixel UP may perform a second signal operation S2 at the third time t3. During the time interval between the second time t2 and the third time t3, the connecting gate signal S_DRG is pulled up, and the large transfer gate signal S_LTG may be pulled up and then pulled down. When the connecting gate signal S_DRG is pulled up, the connecting transistor DRT may connect the first node ND1 and the second node ND2. That is, the floating diffusion region of the unit pixel UP may have a capacitance including the first node ND1 and the second node ND2. Further, when the large transfer gate signal S_LTG is pulled up, the charges may be transferred from the large photodiode LPD to the first node ND1 and the second node ND2. That is, the charges transmitted to the first node ND1 and the second node ND2 may be converted into the second signal voltage VS2 by the source follower SF.

Further, the unit pixel UP may perform the second reset operation R2 at a fourth time t4. At this time, the reset gate signal S_RG may be pulled up and then pulled down. Therefore, the charges of the first node ND1 and the second node ND2 may be reset by the reset transistor RT. The source follower SF may output a second reset voltage VR2 obtained by converting the charges of the first node ND1 and the second node ND2 after the reset.

Referring to FIG. 6, the second operation OP2 may include a second reset operation R2 and a second signal operation S2. The second operation OP2 may have a second minimum illuminance Min2 and a second maximum illuminance Max2. That is, the second operation OP2 may correspond to a second dynamic range DR2 corresponding to the region from the second minimum illuminance Min2 to the second maximum illuminance Max2. The signal output by the second operation OP2 may have a second dynamic range DR2. The second dynamic range DR2 may overlap the first dynamic range DR1. The second dynamic range DR2 may have the second minimum illuminance Min2 and the second maximum illuminance Max2 that are higher than the first dynamic range DR1. The signal-to-noise ratio of the second operation OP2 may be greater than the minimum signal-to-noise ratio SNRmin. At this time, the unit pixel UP may output a signal with less noise and a wide dynamic range.

The large photodiode LPD may correspond to a more sensitive photoelectric conversion unit. Therefore, even if small amounts of light are received, the large photodiode LPD may react to the received light. However, the small photodiode SPD is less sensitive than the large photodiode LPD, and therefore may not react to small amounts of light. The first operation OP1 and the second operation OP2 react to even small amounts of light by the large photodiode LPD, and therefore, may represent the first dynamic range DR1 and the second dynamic range DR2.

Figure 9:
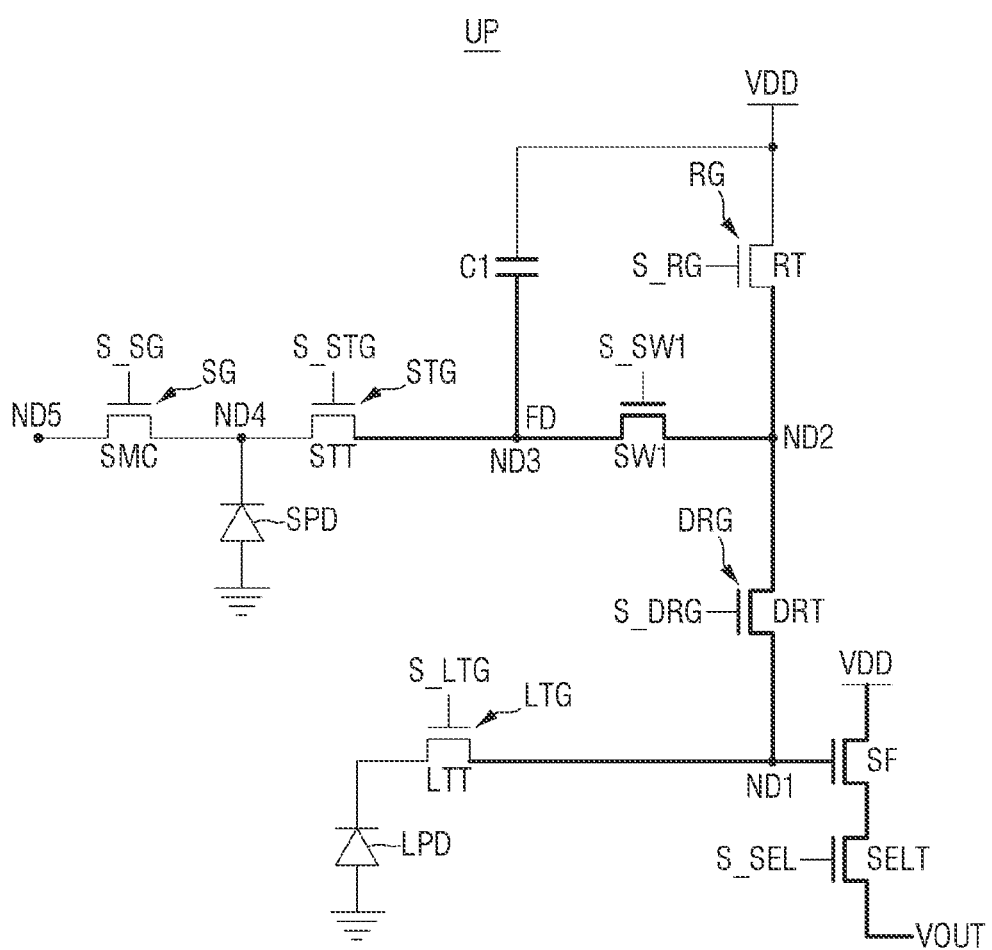

Referring to FIGS. 4, 5 and 9, the unit pixel UP may perform the third signal operation S3 at a fifth time t5. The first switch signal S_SW1 may be pulled up during the time interval between the fourth time t4 and the fifth time t5. That is, the first switch SW1 may be turned on, and the first switch SW1 may connect the second node ND2 and the third node ND3. That is, at the fifth time t5, the charges accumulated in the first node ND1, the second node ND2, and the third node ND3 may be converted into a third signal voltage VS3 through the source follower SF. The floating diffusion region of the unit pixel UP may have a capacitance including the first node ND1, the second node ND2, and the third node ND3. That is, the floating diffusion region of the unit pixel UP may have a high capacitance and a high full-well capacitor at the fifth time t5. At this time, the charges charged in the first capacitor C1 may be transferred through the third node ND3.

Further, the unit pixel UP may perform a third reset operation R3 at a sixth time t6. The source follower SF may output a third reset voltage VR3 obtained by converting the charges of the first node ND1, the second node ND2, and the third node ND3.

Referring to FIG. 6, the third operation OP3 may include a third reset operation R3 and a third signal operation S3. The third operation OP3 may have a third minimum illuminance Min3 and a third maximum illuminance Max3. That is, the third operation OP3 may correspond to a third dynamic range DR3 corresponding to the region from the third minimum illuminance Min3 to the third maximum illuminance Max3. The signal output by the third operation OP3 may have a third dynamic range DR3. In embodiments, the third dynamic range DR3 does not overlap the first and second dynamic ranges DR1 and DR2. The third dynamic range DR3 may have the third minimum illuminance Min3 and the third maximum illuminance Max3 that are higher than the second dynamic range DR2. The signal-to-noise ratio of the third operation OP3 may be greater than the minimum signal-to-noise ratio SNRmin. The unit pixel UP outputs a signal obtained by converting the charges charged in the first to third nodes ND1 to ND3 and the first capacitor C1. Therefore, the capacitance of the floating diffusion region of the unit pixel UP may be large, and the full-well capacitor may also be large. At this time, the third dynamic range DR3 may be used for image sensing in a high illuminance environment.

Referring to FIGS. 4 and 5, the unit pixel UP may perform the fourth reset operation R4 at a seventh time t7. In embodiments, the signal does not change during the time interval between the sixth time t6 and the seventh time t7. The charges accumulated in the first node ND1, the second node ND2, and the third node ND3 may be output to a fourth reset voltage VR4 through the source follower SF. At this time, the fourth reset operation R4 may be omitted. For example, when the fourth reset operation R4 is omitted, the third reset voltage VR3 generated by the third reset operation R3 may be used.

In an embodiment, during the time interval between the sixth time t6 and the seventh time t7, since the reset gate signal S_RG is pulled up and then pulled down, all of the first to third nodes ND1 to ND3 may be reset. Accordingly, the first capacitor C1 may also be reset. Subsequently, the fourth reset voltage VR4 may be output. In some embodiments, this operation may be omitted.

Figure 10:
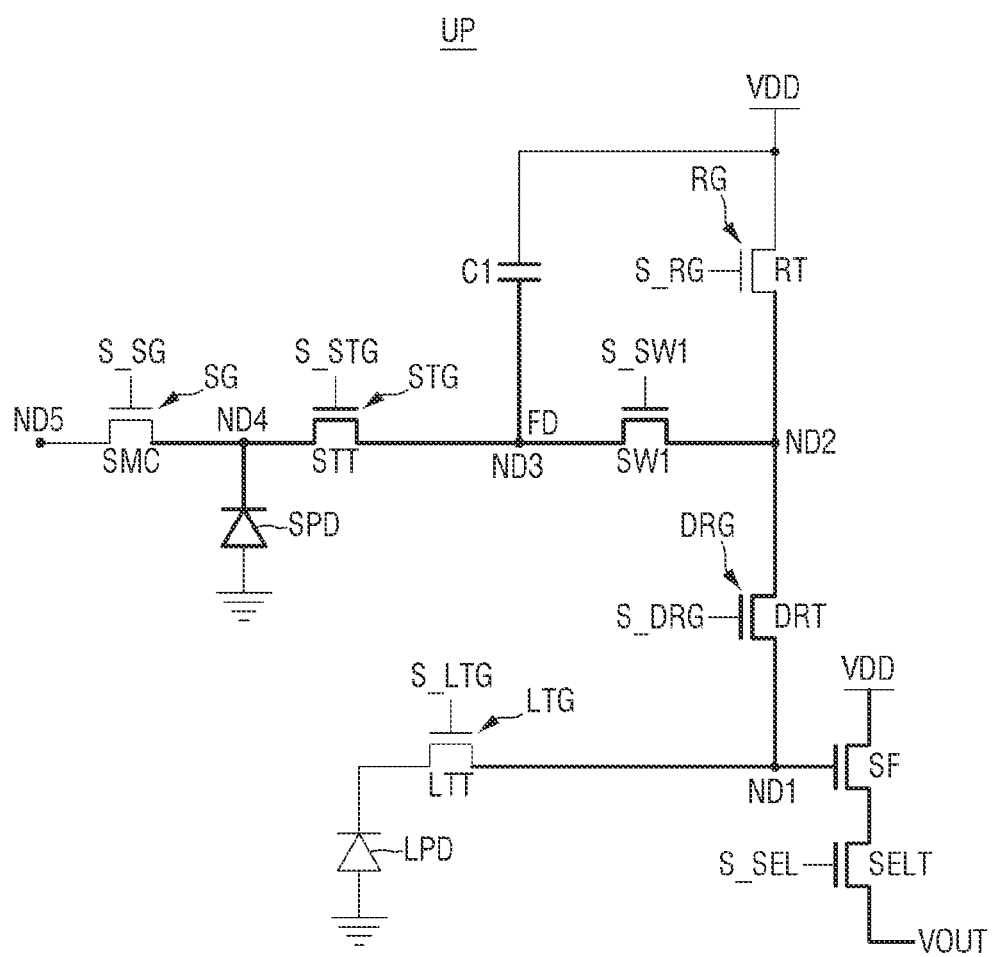

Referring to FIGS. 5 and 10, the unit pixel UP may perform a fourth signal operation S4 at an eighth time t8. During the time interval between the seventh time t7 and the eighth time t8, the small transfer gate signal S_STG may be pulled up and then pulled down. Further, the storage gate signal S_SG maintained in the pulled-up state may be pulled down and then pulled up during the time interval between the seventh time t7 and the eighth time t8. That is, the charges accumulated in the storage gate SG until the seventh time t7 may be emitted from the seventh time t7 to the eighth time t8. For example, the charges stored by the storage MOS capacitor SMC and the charges stored in the small photodiode SPD may be transferred through the first node ND1, the second node ND2, the third node ND3, and the fourth node ND4. At this time, the small transfer transistor STT may connect the fourth node ND4 and the third node ND3. That is, the unit pixel UP may output a fourth signal voltage VS4 obtained by converting the charges accumulated in the first to fourth nodes ND1 to ND4, the small photodiode SPD, and the storage gate SG. The third node ND3 may correspond to the floating diffusion region FD. At this time, the capacitance of the floating diffusion region of the unit pixel UP may be relatively large, and therefore, the full-well capacitance may also be large.

The selection signal S_SEL may be pulled down during the time interval between the eighth time t8 and a ninth time t9. Further, since the reset gate signal S_RG is pulled up and then pulled down, all of the first to fourth nodes ND1 to ND4 may be reset. At this time, the first switch signal S_SW1 may be maintained in the pulled-up state. The first switch signal S_SW1 may be pulled down after the ninth time t9.

Referring to FIG. 6, a fourth operation OP4 may include a fourth reset operation R4 and a fourth signal operation S4. The fourth operation OP4 may have a fourth minimum illuminance Min4 and a fourth maximum illuminance Max4.

That is, the fourth operation OP4 may correspond to a fourth dynamic range DR4 corresponding to the region from the fourth minimum illuminance Min4 to the fourth maximum illuminance Max4. The signal output by the fourth operation OP4 may have the fourth dynamic range DR4.

The third operation OP3 and the fourth operation OP4 may correspond to the operation on the small photodiode SPD. The small photodiode SPD is less sensitive than the large photodiode LPD, and therefore may react to large amounts of light. The third operation OP3 and the fourth operation OP4 react to large amounts of light by the small photodiode SPD, and therefore may represent the third dynamic range DR3 and the fourth dynamic range DR4.

The maximum illuminance of the unit pixel UP when the storage MOS capacitor SMC is not connected to the fourth node ND4 may correspond to the fourth maximum illuminance Max4. The maximum illuminance of the unit pixel UP when the storage MOS capacitor SMC according to an embodiment of the present invention is connected to the fourth node ND4 may correspond to the fourth maximum illuminance Max4. That is, since the unit pixel UP includes the storage MOS capacitor SMC, and the storage MOS capacitor SMC accumulates the charges from the small photodiode SPD, the full-well capacity of the unit pixel UP may increase. Accordingly, the fourth dynamic range DR4 may increase. Further, since the fourth dynamic range DR4 exceeding the minimum signal-to-noise ratio SNRmin increases, the image quality may be increased.

Hereinafter, the unit pixel UP including the comparator COMP will be described referring to FIGS. 11 to 14.

Figure 11:
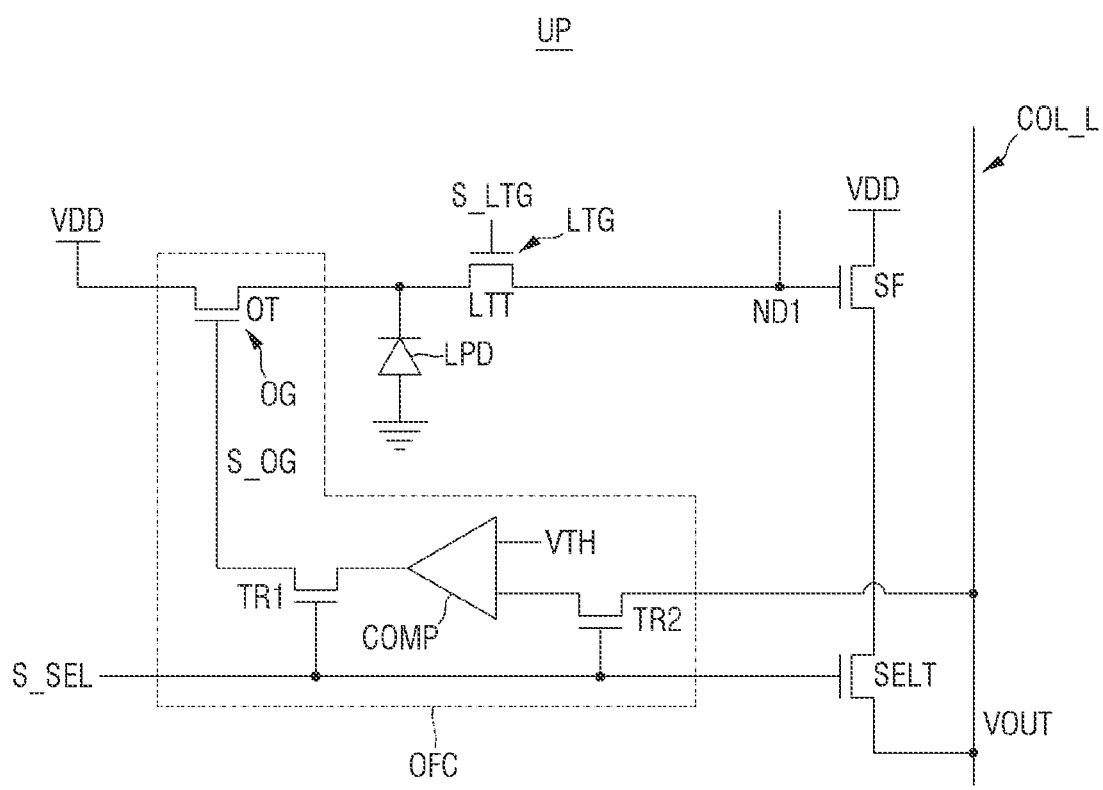
FIG. 11 is a circuit diagram of a unit pixel including an overflow transistor according to some embodiments.
Figure 12:
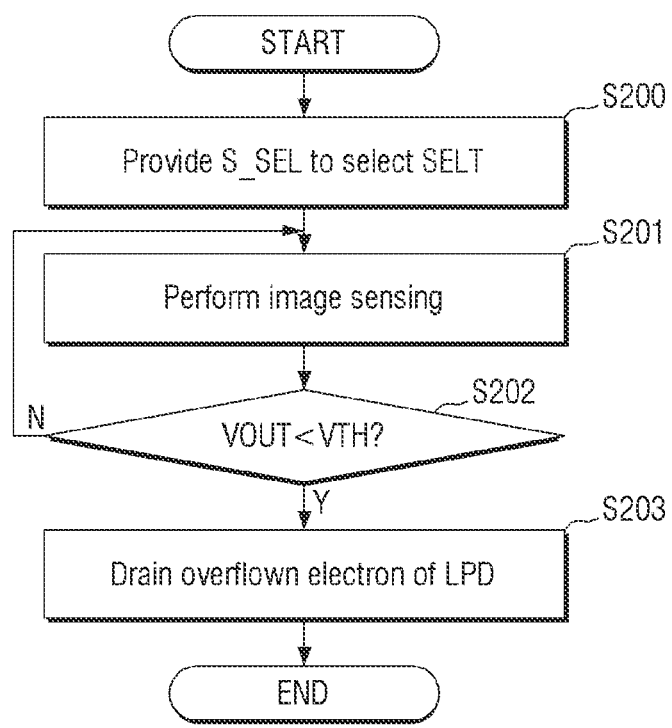
FIG. 12 is a flowchart explaining a method of draining charges of a large photodiode of the unit pixel according to some embodiments.
Figure 13:
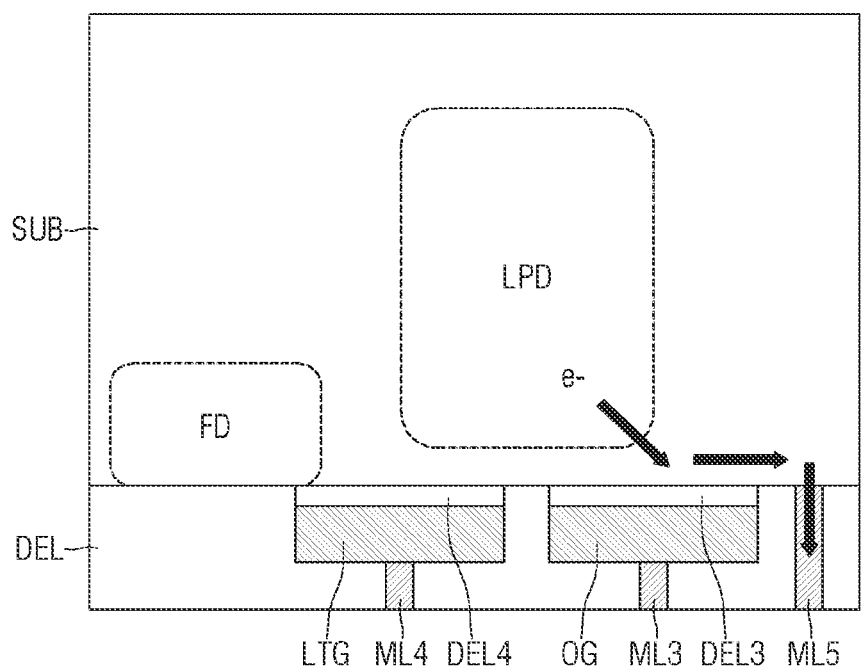
FIG. 13 is a cross-sectional view for explaining the method of draining the charges of the large photodiode of the unit pixel according to some embodiments.
Figure 14:
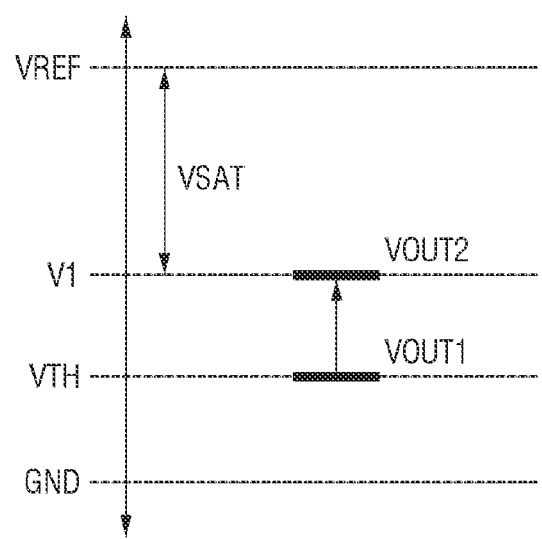
FIG. 14 is a diagram which shows an output voltage according to some embodiments.

FIG. 11 is a circuit diagram of a unit pixel including an overflow transistor according to some embodiments. FIG. 12 is a flowchart for explaining for a method of draining the charges of the large photodiode of the unit pixel according to some embodiments. FIG. 13 is a cross-sectional view for explaining a method of draining the charges of the large photodiode of the unit pixel according to some embodiments. FIG. 14 is a diagram which shows the output voltage according to some embodiments.

Referring to FIG. 11, the unit pixel UP may include a column line COL_L, a source follower SF, a selection transistor SELT, a large photodiode LPD, a large transfer transistor LTD, and an overflow feedback circuit OFC. In some embodiments, the unit pixel UP may further include a small photodiode SPD or the like. In some embodiments, the unit pixel UP does not include a small photodiode SPD or the like.

An input terminal of the comparator COMP may be connected to the column line COL_L. Further, the input terminal of the comparator COMP may receive a threshold voltage VTH. The first transistor TR1 may connect an output terminal of the comparator COMP and the overflow gate OG. Further, the second transistor TR2 may connect the input terminal of the comparator COMP and the column line COL_L. Further, both the first and second transistors TR1 and TR2 may be connected to the gate of the selection transistor SELT. The first and second transistors TR1 and TR2 may receive the selection signal S_SEL. The selection signal S_SEL corresponds to a signal for driving the selection transistor SELT, and thus, the row of the pixel array PA may be selected.

The first transistor TR1 may operate on the basis of the selection signal S_SEL. For example, the first transistor TR1 may connect the comparator COMP and the overflow gate OG when the selection signal S_SEL is at a logic high level. That is, in this case, the first transistor TR1 may transfer the overflow gate signal S_OG to the overflow gate OG. Further, in embodiments, when the selection signal S_SEL is at the logic low level, the first transistor TR1 does not connect the comparator COMP and the overflow gate OG. That is, even if the overflow gate signal S_OG is output from the comparator COMP, in embodiments, the overflow gate signal S_OG is not provided to the overflow gate OG.

The second transistor TR2 may operate on the basis of the selection signal S_SEL. For example, when the selection signal S_SEL is at a logic high level, the second transistor TR2 may connect the input terminal of the comparator COMP and the column line COL_L. Therefore, the comparator COMP may receive the output voltage VOUT from the column line COL_L. Further, in embodiments, when the selection signal S_SEL is at the logic low level, the second transistor TR2 does not connect the comparator COMP and the column line COL_L.

The comparator COMP may receive the threshold voltage VTH, and may receive the output voltage VOUT from the column line COL_L through the second transistor TR2. The comparator COMP may output the overflow gate signal S_OG by comparing the threshold voltage VTH and the output voltage VOUT.

When the output voltage VOUT is smaller than the threshold voltage VTH, the comparator COMP may provide the overflow gate signal S_OG to the overflow gate OG to allow the overflow transistor OT to operate. For example, when the output voltage VOUT is smaller than the threshold voltage VTH, the comparator COMP may supply the pulled-up overflow gate signal S_OG to the overflow gate OG, and the overflow transistor OT may connect the large photodiode LPD to the power supply voltage VDD. Accordingly, the charges overflowing from the large photodiode LPD may be drained. At this time, the overflow transistor OT may operate when the selection signal S_SEL is pulled up.

When the output voltage VOUT is not smaller than the threshold voltage VTH, the comparator COMP may provide the pulled-down overflow gate signal S_OG to the overflow gate OG. At this time, in embodiments, the overflow transistor OT does not operate, and the charges are not drained from the large photodiode LPD.

Referring to FIGS. 11 to 14, the image sensor 100 may provide the selection signal S_SEL to select the selection transistor SELT (S200). For example, the row driver 1130 may provide the selection signal S_SEL to the selection transistor SELT included in the unit pixel UP of the pixel array PA. When the selection signal S_SEL is pulled up, the corresponding unit pixel UP may be selected. Subsequently, the image sensor 100 may perform image sensing on the unit pixel UP (S201).

The comparator COMP may determine whether the output voltage VOUT is smaller than the threshold voltage VTH (S202). When the output voltage VOUT is not smaller than the threshold voltage VTH (S202-N), the image sensor 100 may continue to perform the image sensing.

When the output voltage VOUT is smaller than the threshold voltage VTH (S202-Y), the overflow transistor OT may drain the overflowed charges of the large photodiode LPD (S203). That is, the first transistor TR1 and the second transistor TR2 may be turned on, and the overflow transistor OT may be turned on by the overflow gate signal S_OG that is output from the comparator COMP.

Referring to FIG. 13, the unit pixel UP may include a substrate SUB, an insulating layer DEL, a large photodiode LPD, a floating diffusion region FD, a third insulating layer DEL3, an overflow gate OG, a third metal layer ML3, a fourth insulating layer DEL4, a large transfer gate LTD, a fourth metal layer ML4, and a fifth metal layer ML5.

The charges overflowing from the large photodiode LPD may move to the fifth metal layer ML5 through the region of the substrate SUB below the overflow gate OG when the overflow transistor OT operates. The fifth metal layer ML5 may be connected to the power supply voltage VDD. That is, the charges overflowing from the large photodiode LPD may be drained. The quality of the image that is output from the image sensor 100 can be increased accordingly.

Referring to FIGS. 11 and 14, the output voltage VOUT applied to the column line COL_L may correspond a region between the ground voltage GND and the reference voltage VREF. For example, when the data output from the unit pixel UP corresponds to 0, the output voltage VOUT may correspond to the reference voltage VREF, and when the data output from the unit pixel UP corresponds to 1023, the output voltage VOUT may correspond to the first voltage V1. The region between the first voltage V1 and the reference voltage VREF may correspond to a saturation voltage region VSAT representing the pixel signal.

Further, even when the output voltage VOUT is smaller than the first voltage V1, the data that is output from the unit pixel UP may correspond to 1023. However, embodiments of the present invention are not limited thereto. However, when an overflow occurs from the large photodiode LPD, the output voltage VOUT may become excessively smaller than the first voltage V1. When the output voltage VOUT approaches the ground voltage GND, there may be abnormality in the quality of the image that is output from the unit pixel UP.

When the output voltage VOUT becomes smaller than the threshold voltage VTH, for example, when the output voltage VOUT is a first output voltage VOUT1, as the overflow transistor OT operates, the charges overflowing from the large photodiode LPD may be drained. Therefore, the output voltage VOUT may become a second output voltage VOUT2.

According to embodiments of the present invention, the overflow transistor OT connected to the large photodiode LPD may be controlled by comparing the levels of the threshold voltage VTH and the output voltage VOUT through the comparator COMP. When the output voltage VOUT is smaller than the threshold voltage VTH, the overflow transistor OT may drain the charges overflowing from the large photodiode LPD, and the image quality can be increased accordingly. Further, the overflow feedback circuit OFC may operate efficiently on the basis of the selection signal S_SEL and the output voltage VOUT. That is, the overflow feedback circuit OFC may operate only when the unit pixel UP is selected.

Hereinafter, the first column COL1 according to some embodiments will be described with reference to FIGS. 15 and 16.

Figure 15:
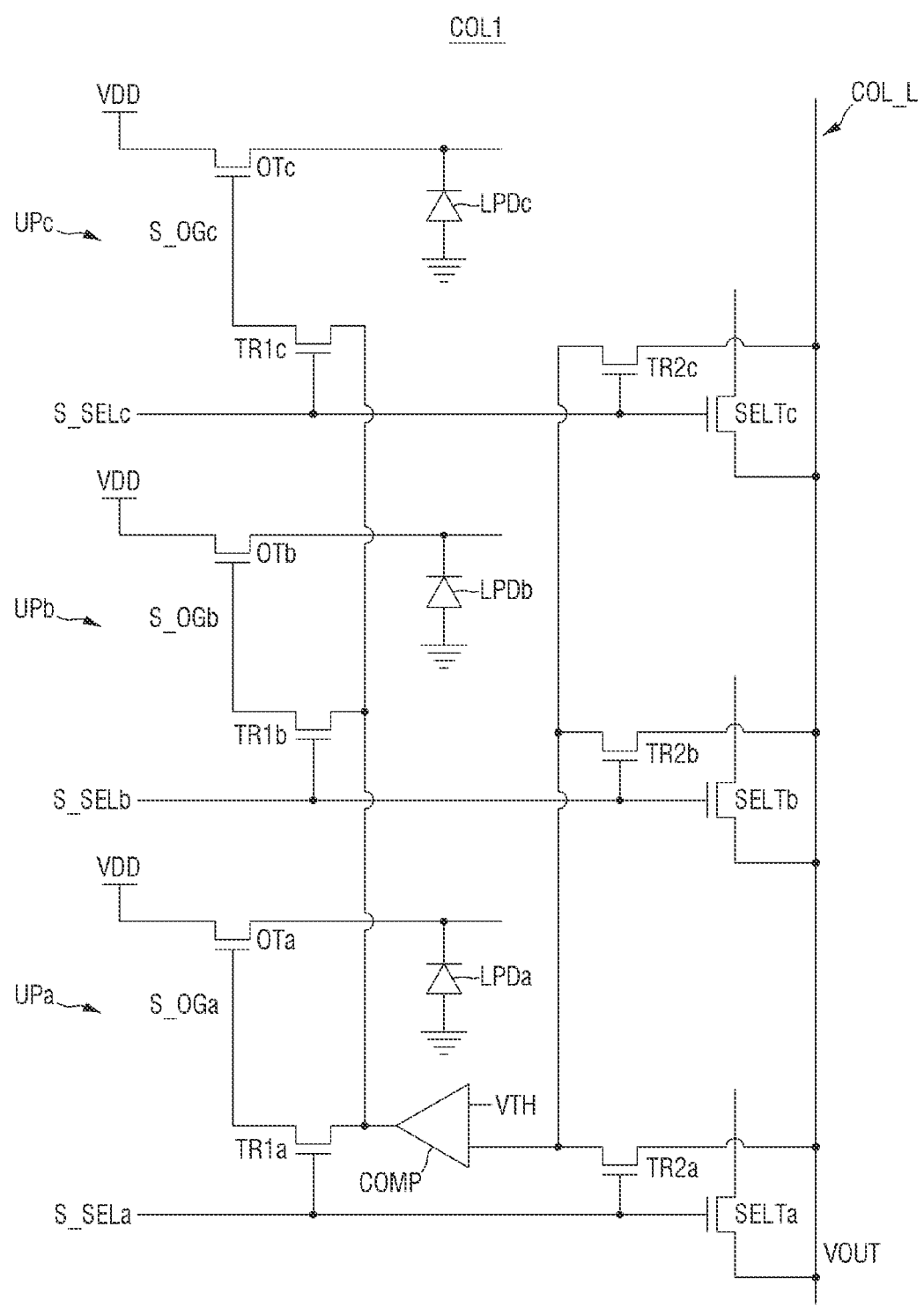
FIG. 15 is a circuit diagram of a first column including a plurality of unit pixels according to some embodiments.

FIG. 15 is a circuit diagram of a first column including a plurality of unit pixels according to some embodiments. FIG. 16 is a block diagram of an image sensor according to some embodiments. For convenience of explanation, a further description of components and technical aspects previously described will be only briefly described or omitted.

Referring to FIG. 15, the first column COL1 may include a plurality of unit pixels UPa, UPb, and UPc. The plurality of unit pixels UPa, UPb, and UPc may be arranged in the second direction Y, and may correspond to the unit pixel UP of FIG. 4. Further, the first column COL1 may include a comparator COMP connected to the plurality of unit pixels UPa, UPb, and UPc. That is, the comparator COMP and the plurality of unit pixels UPa, UPb, and UPc may be disposed separately from each other.

The unit pixel UPa may include a large photodiode LPDa, an overflow transistor OTa, a selection transistor SELTa, and first and second transistors TR1$a$ and TR2$a$. The unit pixel UPb may include a large photodiode LPDb, an overflow transistor OTb, a selection transistor SELTb, and first and second transistors TR1$b$ and TR2$b$. The unit pixel UPc may include a large photodiode LPDc, an overflow transistor OTc, a selection transistor SELTc, and first and second transistors TR1$c$ and TR2$c$. The plurality of unit pixels UPa, UPb, and UPc may all be connected to the column line COL_L or may be connected to the comparator COMP.

The first transistors TR1$a$, TR1$b$ and TR1$c$ may be connected to an output end of the comparator COMP, and the second transistors TR2$a$, TR2$b$ and TR2$c$ may be connected to an input end of the comparator COMP. The comparator COMP may provide an overflow gate signal S_OGa, which is the result obtained by comparing the output voltage VOUT transferred through the second transistor TR2$a$ with the threshold voltage VTH, to the overflow transistor OTa through the first transistor TR1$a$. The comparator COMP may provide an overflow gate signal S_OGb, which is the result obtained by comparing the output voltage VOUT transferred through the second transistor TR2$b$ with the threshold voltage VTH, to the overflow transistor OTb through the first transistor TR1$b$. The comparator COMP may provide an overflow gate signal S_OGc, which is the result obtained by comparing the output voltage VOUT transferred through the second transistor TR2$c$ with the threshold voltage VTH, to the overflow transistor OTc through the first transistor TR1$c$. At this time, each of the unit pixels UPa, UPb, and UPc may operate at different times from each other. This may be performed by a plurality of selection signals S_SELa, S_SELb, and S_SELc. That is, one comparator COMP may compare the voltages of the unit pixels corresponding to the first column COL1 and drain the overflow charges of the large photodiodes.

Figure 16:
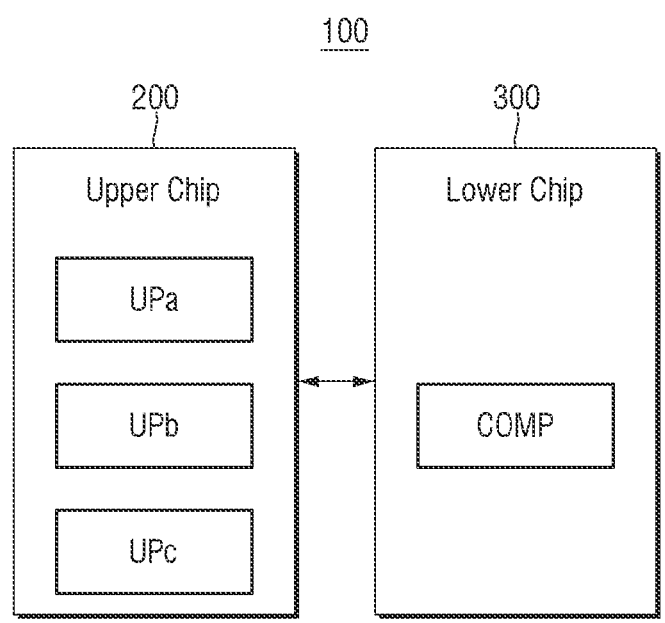
FIG. 16 is a block diagram of an image sensor according to some embodiments.

Referring to FIG. 16, the image sensor 100 may include an upper chip 200 and a lower chip 300. The upper chip 200 may include a plurality of unit pixels UPa, UPb, and UPc, and the lower chip 300 may include a comparator COMP. In this way, the plurality of unit pixels UPa, UPb, and UPc and the comparator COMP may be disposed separately from each other. The comparator COMP may correspond to the form of the out pixel.

Hereinafter, a unit pixel UP' according to some embodiments will be described with reference to FIGS. 17 and 18.

Figure 17:
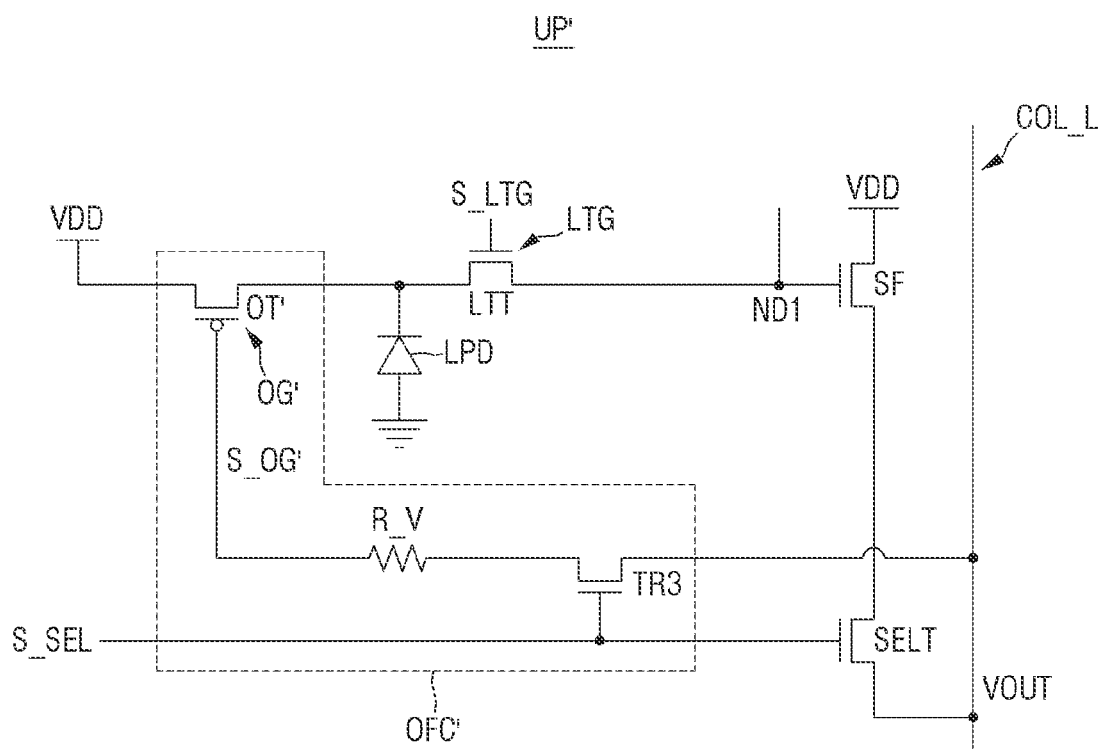
FIG. 17 is a circuit diagram of the unit pixel according to some embodiments.

FIG. 17 is a circuit diagram of a unit pixel according to some embodiments. FIG. 18 is a flowchart for explaining a method of draining the charges of the large photodiode of the unit pixel according to some embodiments. For convenience of explanation, a further description of components and technical aspects previously described will be only briefly described or omitted.

Referring to FIG. 17, the unit pixel UP' may include a large photodiode LPD, a large transistor LTT, a source follower SF, a selection transistor SELT, and an overflow feedback circuit OFC'. The overflow feedback circuit OFC' may include an overflow transistor OT', a variable resistor R_V, and a third transistor TR3. In embodiments, the small photodiode SPD is not included in the unit pixel UP'.

The overflow transistor OT' may be connected to the large photodiode LPD and the power supply voltage VDD. The overflow gate OG' of the overflow transistor OT' may be connected to the third transistor TR3. The overflow gate OG' and the third transistor TR3 may be connected by a variable resistor R_V. The overflow transistor OT' may correspond to a p-type metal-oxide semiconductor (PMOS) transistor. The overflow transistor OT' corresponding to the PMOS transistor may be turned on when the voltage level of the overflow gate signal S_OG' applied to the overflow gate OG' is lower than the level of a specific voltage. That is, when the voltage level of the overflow gate signal S_OG' is low, the overflow transistor OT' may be turned on to drain the charges overflowing from the large photodiode LPD.

The third transistor TR3 may adjust the variable resistor R_V. For example, the third transistor TR3 may adjust the threshold voltage or the wordline voltage to increase or decrease the variable resistor R_V. Accordingly, the variable resistor R_V is changed, and thus, the operation of the overflow transistor OT' can be adjusted.

The third transistor TR3 may be connected to all of the column line COL_L, the selection transistor SELT, and the overflow transistor OT'. The third transistor TR3 may be turned on when the selection signal S_SEL is pulled up. The third transistor TR3 may provide the output voltage VOUT to the overflow gate OG'. That is, when the third transistor TR3 is turned on, the overflow gate signal S_OG' may be the same as the output voltage VOUT.

Figure 18:
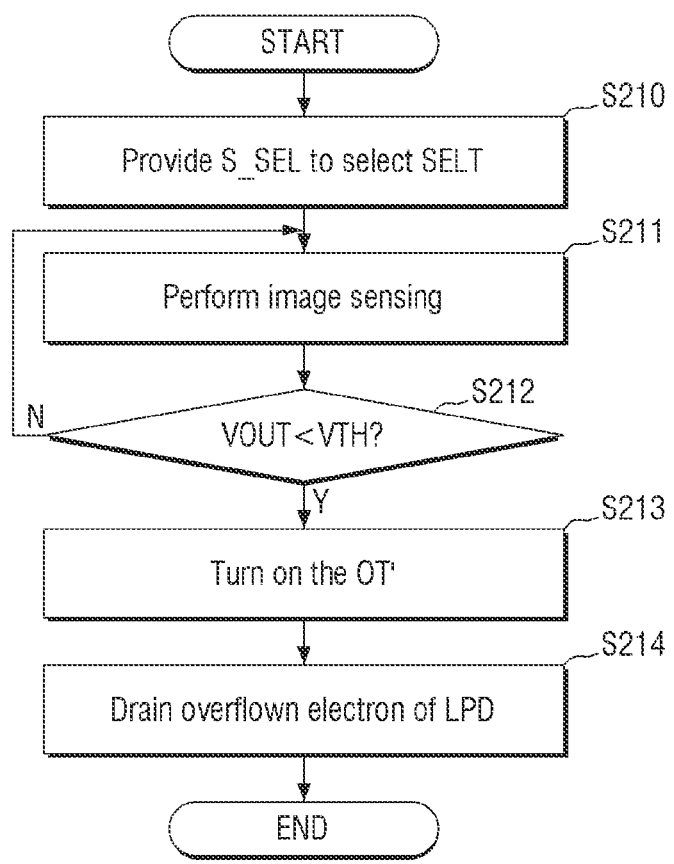
FIG. 18 is a flowchart explaining a method of draining the charges of the large photodiode of the unit pixel according to some embodiments.

Referring to FIGS. 17 and 18, the image sensor 100 may provide the selection signal S_SEL to select the selection transistor SELT (S210). When the selection signal S_SEL is pulled up, the corresponding unit pixel UP' may be selected. Subsequently, the image sensor 100 may perform the image sensing on the unit pixel UP' (S211).

The unit pixel UP' may determine whether the output voltage VOUT is smaller than the threshold voltage VTH (S212). When the output voltage VOUT is not smaller than the threshold voltage VTH (S212-N), the image sensor 100 may continue to perform the image sensing. For example, in embodiments, when the level of the output voltage VOUT is greater than the threshold voltage VTH, the overflow transistor OT' is not turned on.

When the output voltage VOUT is smaller than the threshold voltage VTH (S212-Y), the unit pixel UP' may turn on the overflow transistor OT' (S213). The overflow transistor OT' may be turned on when the overflow gate signal S_OG' or the output voltage VOUT is smaller than the threshold voltage VTH. This is because the overflow transistor OT' is a PMOS transistor. As a result, the overflow transistor OT' may drain the overflow charges of the large photodiode LPD (S214).

Hereinafter, the pixel array PA' according to some embodiments will be described referring to FIGS. 19 to 22.

Figure 19:
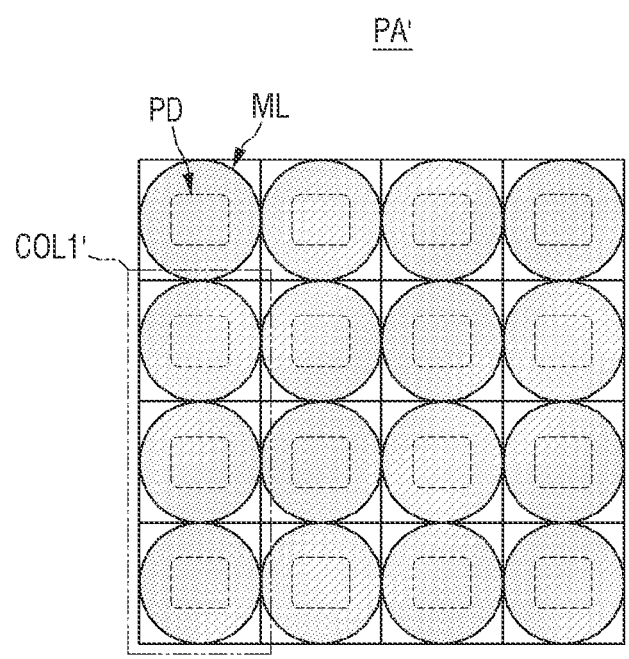
FIG. 19 is a plan view of the pixel array according to some embodiments.
Figure 21:
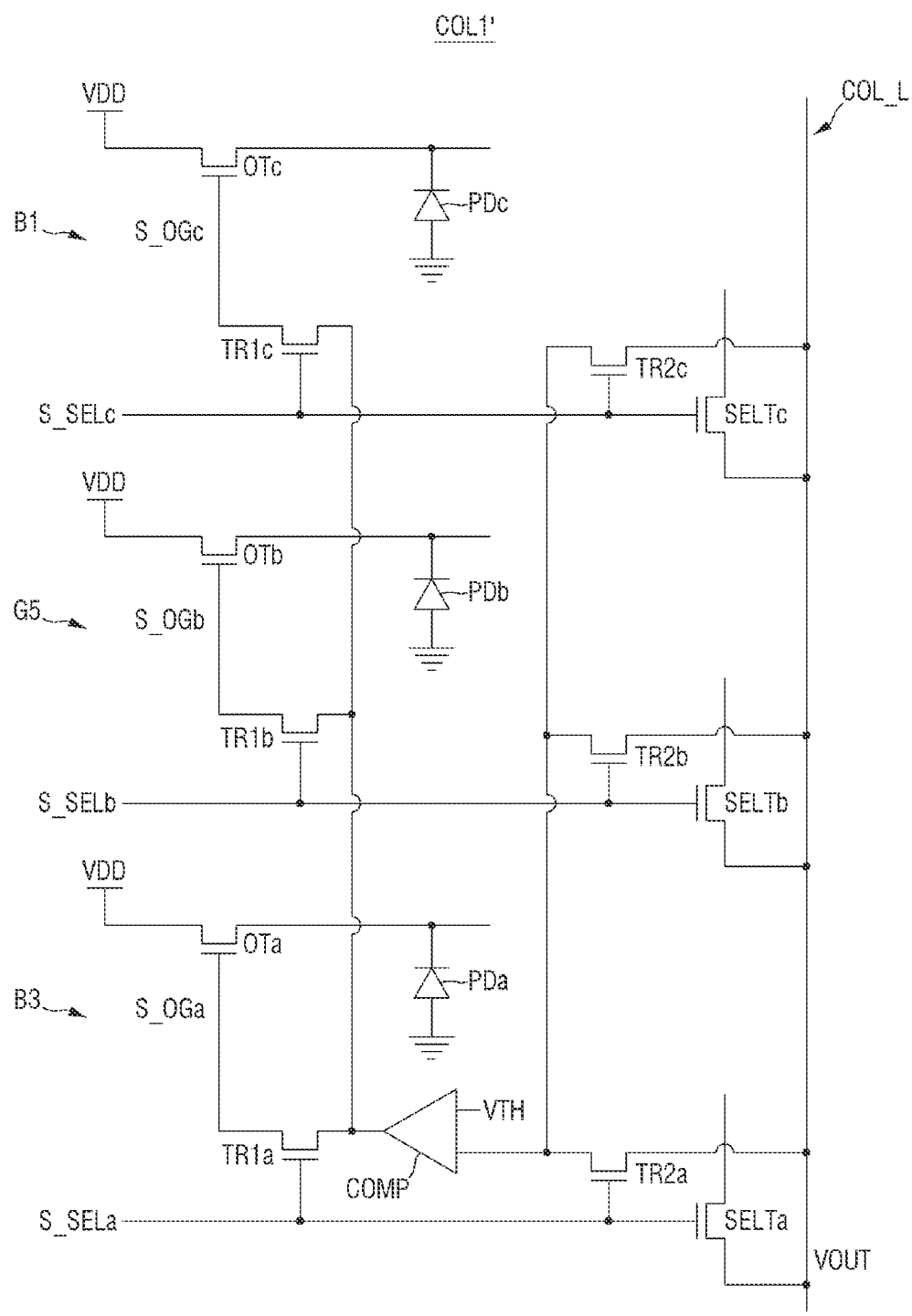
FIG. 21 is a circuit diagram of a first column including the plurality of pixels of FIG. 20 according to some embodiments.
Figure 22:
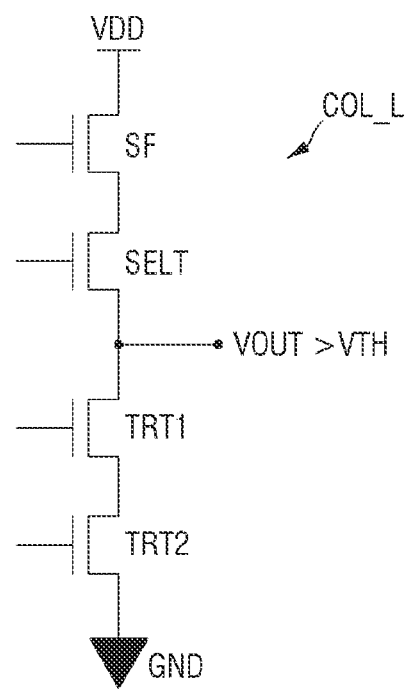
FIG. 22 is a diagram for explaining a column line of FIG. 21 according to some embodiments.

FIG. 19 is a plan view of the pixel array according to some embodiments. FIG. 20 is a diagram for explaining the pixel array of FIG. 19 according to some embodiments. FIG. 21 is a circuit diagram of a first column including the plurality of pixels of FIG. 20 according to some embodiments. FIG. 22 is a diagram for explaining the column line of FIG. 21 according to some embodiments. For convenience of explanation, a further description of components and technical aspects previously described will be only briefly described or omitted.

Referring to FIGS. 19 and 20, the pixel array PA' may include a plurality of photodiodes PD and a plurality of microlenses ML. Each pixel of the pixel array PA' may include one photodiode PD and one microlens ML. The plurality of pixels may be regularly arranged in the first direction (see 'X' of FIG. 3) and the second direction (see 'Y' of FIG. 3). A first column COL1' may include a plurality of pixels arranged in the second direction Y. The pixel array PA' may include first to eighth green pixels G1 to G8, first to fourth red pixels R1 to R4, and first to fourth blue pixels B1 to B4. The first to fourth red pixels R1 to R4 and the first to fourth blue pixels B1 to B4 may be disposed between the first to eighth green pixels G1 to G8. The first column COL1' will be described as including a first blue pixel B1, a fifth green pixel G5, and a third blue pixel B3.

Referring to FIG. 21, the first column COL1' may include the first blue pixel B1, the fifth green pixel G5, and the third blue pixel B3 connected to the column line COL_L. Each pixel is an example, and embodiments of the present invention are not limited thereto.

The third blue pixel B3 may include a photodiode PDa, first and second transistors TR1a and TR2a, a selection transistor SELTa, and an overflow transistor OTa. The fifth green pixel G3 may include a photodiode PDb, first and second transistors TR1b and TR2b, a selection transistor SELTb, and an overflow transistor OTb. The first blue pixel B1 may include a photodiode PDc, first and second transistors TR1c and TR2c, a selection transistor SELTc, and an overflow transistor OTc.

The first column COL1' may include a comparator COMP. The comparator COMP may be connected to a plurality of pixels of the first column COL1'. The comparator COMP may output the result obtained by comparing the output voltage VOUT received from the column line COL_L with the threshold voltage VTH to operate the overflow transistors OTa, OTb, and OTc. Accordingly, the charges overflowing from the photodiodes PDa, PDb, and PDc may be drained. In the first column COL1 described with reference to FIGS. 1 to 18, the comparator COMP is used for the pixels including two photodiodes. On the other hand, the comparator COMP of the first column COL1' performs a comparison operation on the pixel including one photodiode, and may drain the charges.

Referring to FIG. 22, the column line COL_L may include a source follower SF, a selection transistor SELT, a first transistor TRT1 and a second transistor TRT2. The source follower SF and the selection transistor SELT may be connected between the power supply voltage VDD and the output voltage VOUT, and the first and second transistors TRT1 and TRT2 may be connected between the output voltage VOUT and the ground voltage GND. Because a part of the power supply voltage VDD is consumed by the first and second transistors TRT1 and TRT2, a head room for the output voltage VOUT may be required. That is, the output voltage VOUT is to be greater than the threshold voltage VTH.

In an embodiment, the first and second transistors TRT1 and TRT2 may include at least one of a line disconnect transistor, a cascode transistor, and a bias load transistor. The bias load transistor may be used for stability of the circuit. As the bias load transistor is used in the column line COL_L, a head room may be further needed for the output voltage VOUT. That is, in an embodiment of the present invention, the output voltage VOUT is to be greater than the threshold voltage VTH.

As the charges overflowing from the photodiodes PDa, PDb and PDc are drained by the comparator COMP and the overflow transistors OTa, OTb and OTc, the output voltage VOUT may be kept greater than the threshold voltage VTH. Therefore, the image sensor 100 having increased performance may be provided.

Figure 23:
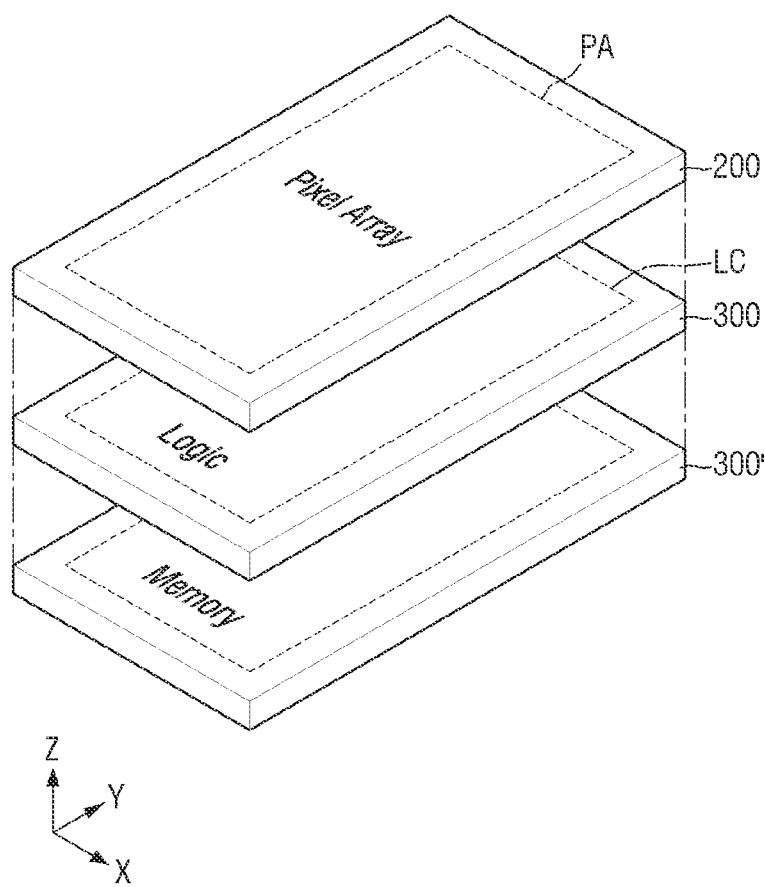
FIG. 23 is a diagram which shows a conceptual layout of the image sensor according to some embodiments.

FIG. 23 is a diagram which shows a conceptual layout of an image sensor according to some embodiments.

Referring to FIG. 23, an image sensor 100''' may include an upper chip 200, a lower chip 300, and a memory chip 300'. The upper chip 200, the lower chip 300, and the memory chip 300' may be sequentially stacked along a third direction Z. The memory chip 300' may be placed below the lower chip 300. The memory chip 300' may include a memory device. For example, the memory chip 300' may include a volatile memory device such as a DRAM or a SRAM. The memory chip 300' may receive signals from the upper chip 200 and the lower chip 300 and process the signals through the memory device. That is, the image sensor 100''' including the memory chip 300' may correspond to a three-stack image sensor.

Hereinafter, a vehicle 700 including an image sensor 730 according to an embodiment will be described referring to FIG. 24.

Figure 24:
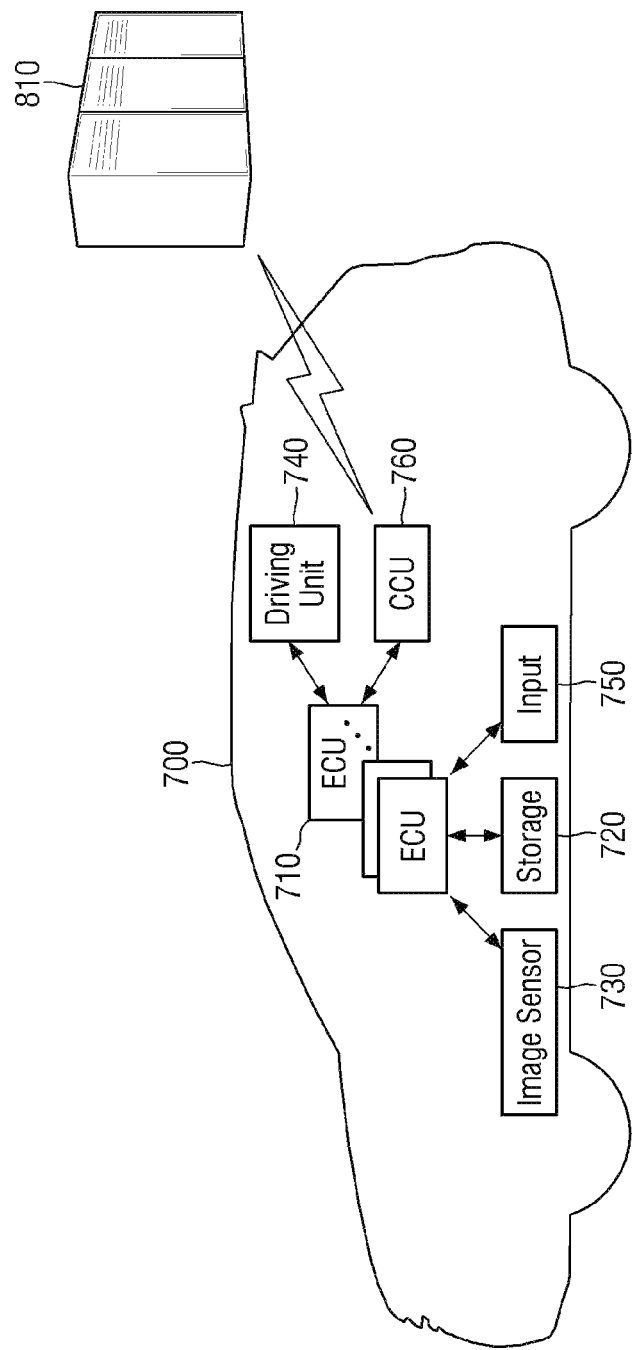
FIG. 24 is a diagram of a vehicle including the image sensor according to some embodiments.

FIG. 24 is a diagram of a vehicle including an image sensor according to some embodiments. For convenience of explanation, a further description of components and technical aspects previously described will be only briefly described or omitted.

Referring to FIG. 24, the vehicle 700 may include a plurality of electronic control units (ECU) 710 and a storage device 720.

Each electronic control unit of the plurality of electronic control units 710 is electrically, mechanically, and communicatively connected to at least one of the plurality of devices provided in the vehicle 700, and may control the operation of at least one device on the basis of any one function execution command.

The plurality of devices may include an image sensor 730 that acquires information utilized to perform at least one function, and a driving unit 740 that performs at least one function.

For example, the image sensor 730 may include the image sensor 100 according to embodiments of the present invention described above. That is, the image sensor 730 may correspond to the image sensor 100 including the unit pixel UP. The image sensor 730 may correspond to an automotive image sensor.

The driving unit 740 may include, for example, a fan and a compressor of an air conditioner, a fan of a ventilation device, an engine and a motor of a power device, a motor of a steering device, a motor and a valve of a brake device, an opening/closing device of a door or a tailgate, etc.

The plurality of electronic control units 710 may communicate with the image sensor 730 and the driving unit 740 using, for example, at least one of an Ethernet, a low voltage differential signaling (LVDS) communication, and a LIN (Local Interconnect Network) communication protocol.

The plurality of electronic control units 710 may determine whether there is a need to perform the function on the basis of the information acquired through the image sensor 730, and when it is determined that there is a need to perform the corresponding function, the plurality of electronic control units 710 control the operation of the driving unit 740 that performs the function, and may control an amount of operation on the basis of the acquired information. The plurality of electronic control units 710 may store the acquired information in the storage device 720, or may read and use the information stored in the storage device 720.

The plurality of electronic control units 710 is able to control the operation of the driving unit 740 that performs the function on the basis of the function execution command that is input through the input unit 750, and is also able to check the setting amount corresponding to the information that is input through the input unit 750 and control the operation of the driving unit 740 that performs the function on the basis of the checked setting amount.

Each electronic control unit 710 may control any one function independently, or may control any one function in cooperation with other electronic control units.

For example, when a distance to an obstacle detected through a distance detection unit is within a reference distance, an electronic control unit of a collision prevention device may output a warning sound for a collision with the obstacle through a speaker.

An electronic control unit of an autonomous driving control device may receive, for example, navigation information, road image information, and distance information to obstacles in cooperation with the electronic control unit of the vehicle terminal, the electronic control unit of the image acquisition unit, and the electronic control unit of the collision prevention device, and control the power device, the brake device, and the steering device using the received information, thereby performing the autonomous driving.

A connectivity control unit (CCU) 760 is electrically, mechanically, and communicatively connected to each of the plurality of electronic control units 710, and communicates with each of the plurality of electronic control units 710.

That is, the connectivity control unit 760 is able to directly communicate with a plurality of electronic control units 710 provided inside the vehicle, is able to communicate with an external server, and is also able to communicate with an external terminal through an interface.

The connectivity control unit 760 may communicate with the plurality of electronic control units 710, and may communicate with the server 810, using, for example, an antenna and a RF communication.

Further, the connectivity control unit 760 may communicate with the server 810 by wireless communication. The wireless communication between the connectivity control unit 760 and the server 810 may be performed through various wireless communication methods such as, for example, Global System for Mobile Communication (GSM), Code Division Multiple Access (CDMA), Wideband Code Division Multiple Access (WCDMA), Universal Mobile Telecommunications System (UMTS), Time Division Multiple Access (TDMA), and Long Term Evolution (LTE), in addition to a WIFI module and a Wireless Broadband Module.

As is traditional in the field of the present invention, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A unit pixel, comprising:
a first photoelectric conversion unit configured to generate first charges in response to a first incident light;
a first transfer transistor connected between the first photoelectric conversion unit and a first node and configured to transfer the first charges to the first node;
a connecting transistor connected between a second node and the first node;
a second photoelectric conversion unit configured to generate second charges in response to a second incident light;
a second transfer transistor connected between a second photoelectric conversion unit and a third node;
a switch transistor connected between the third node and the second node;
a source follower connected to the first node;
a selection transistor connected to the source follower, and configured to operate based on a selection signal and to output a pixel voltage generated based on the first charges or the second charges;
an overflow transistor connecting the first photoelectric conversion unit and a power supply voltage,
wherein when the overflow transistor turns on, the first charges generated in the first photoelectric conversion unit is drained; and
a comparator configured to turn on the overflow transistor when a level of the pixel voltage is smaller than a level of a threshold voltage.

2. The unit pixel of claim 1, wherein the level of the pixel voltage after the charges of the first photoelectric conversion unit are drained is greater than the level of the threshold voltage.

3. The unit pixel of claim 1, wherein the selection transistor is configured to output the pixel voltage from the source follower when the selection signal has a logic high level, and
the comparator is configured to turn on the overflow transistor based on the level of the pixel voltage when the selection signal has the logic high level.

4. The unit pixel of claim 1, further comprising:
a column line connected to the selection transistor and configured to receive the pixel voltage,
wherein the comparator is configured to receive the pixel voltage from the column line.

5. The unit pixel of claim 1, wherein an area of the first photoelectric conversion unit is greater than an area of the second photoelectric conversion unit.

6. A unit pixel, comprising:
a first photoelectric conversion unit configured to generate first charges in response to a first incident light;
a first transfer transistor connected between the first photoelectric conversion unit and a first node and configured to transfer the first charges to the first node;
a connecting transistor connected between a second node and the first node;
a second photoelectric conversion unit configured to generate second charges in response to a second incident light;
a second transfer transistor connected between a second photoelectric conversion unit and a third node;
a switch transistor connected between the third node and the second node;
a source follower connected to the first node;
a selection transistor connected to the source follower, and configured to operate based on a selection signal and to output a pixel voltage generated based on the first charges or the second charges;
an overflow transistor connecting the first photoelectric conversion unit and a power supply voltage;
a comparator configured to turn on the overflow transistor when a level of the pixel voltage is smaller than a level of a threshold voltage; and
a first transistor connected between the comparator and a gate of the overflow transistor.

7. A unit pixel, comprising:
a first photoelectric conversion unit configured to generate first charges in response to a first incident light;
a first transfer transistor connected between the first photoelectric conversion unit and a first node and configured to transfer the first charges to the first node;
a connecting transistor connected between a second node and the first node;
a second photoelectric conversion unit configured to generate second charges in response to a second incident light;
a second transfer transistor connected between a second photoelectric conversion unit and a third node;
a switch transistor connected between the third node and the second node;
a source follower connected to the first node;
a selection transistor connected to the source follower, and configured to operate based on a selection signal and to output a pixel voltage generated based on the first charges or the second charges;
an overflow transistor connecting the first photoelectric conversion unit and a power supply voltage; and
a comparator configured to turn on the overflow transistor when a level of the pixel voltage is smaller than a level of a threshold voltage,
wherein the comparator is configured to turn off the overflow transistor when the selection signal has a logic low level.

* * * * *